US009487953B2

(12) United States Patent
Nagarajan et al.

(10) Patent No.: US 9,487,953 B2
(45) Date of Patent: Nov. 8, 2016

(54) VACUUM INSULATED PANEL

(71) Applicant: Owens Corning Intellectual Capital, LLC, Toledo, OH (US)

(72) Inventors: Venkata S. Nagarajan, New Albany, OH (US); William J. Grieco, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 14/067,025

(22) Filed: Oct. 30, 2013

(65) Prior Publication Data

US 2015/0118434 A1    Apr. 30, 2015

(51) Int. Cl.
| F16L 59/065 | (2006.01) |
| E04C 2/02 | (2006.01) |
| F25D 23/06 | (2006.01) |
| B32B 17/02 | (2006.01) |
| B32B 37/14 | (2006.01) |
| E04B 1/80 | (2006.01) |
| F24C 15/34 | (2006.01) |
| B32B 38/00 | (2006.01) |

(52) U.S. Cl.
CPC ................. *E04C 2/02* (2013.01); *B32B 17/02* (2013.01); *B32B 37/142* (2013.01); *E04B 1/803* (2013.01); *F25D 23/06* (2013.01); *B32B 2038/0092* (2013.01); *B32B 2307/304* (2013.01); *B32B 2307/718* (2013.01); *B32B 2309/105* (2013.01); *B32B 2315/085* (2013.01); *B32B 2607/00* (2013.01); *F24C 15/34* (2013.01); *F25D 2201/14* (2013.01); *Y02B 80/12* (2013.01); *Y10T 428/231* (2015.01)

(58) Field of Classification Search
CPC ........... Y10T 428/231; Y10T 428/237; Y10T 428/239; E04B 1/80; E04B 1/803
USPC .......................................................... 428/69
See application file for complete search history.

(56) References Cited

U.S. PATENT DOCUMENTS

| 5,090,981 A | 2/1992 | Rusek, Jr. |
| 5,094,899 A | 3/1992 | Rusek, Jr. |
| 5,330,816 A | 7/1994 | Rusek, Jr. |
| 5,505,071 A | 4/1996 | Hall, Jr. et al. |
| 5,527,411 A | 6/1996 | Jutte |
| 5,540,075 A | 7/1996 | Hall, Jr. |
| 5,601,897 A | 2/1997 | Vermilion et al. |
| 5,632,543 A | 5/1997 | McGrath et al. |
| 5,649,438 A | 7/1997 | Hall, Jr. et al. |

(Continued)

FOREIGN PATENT DOCUMENTS

EP    1457612    9/2004

OTHER PUBLICATIONS

Simmler et al., "Vacuum insulation panels for building application Basic properties, aging mechanisms and service life", Energy and Buildings 37, pp. 1 122-1131 (2005).

(Continued)

*Primary Examiner* — Alexander Thomas
(74) *Attorney, Agent, or Firm* — Calfee, Halter & Griswold LLP

(57) ABSTRACT

A vacuum insulated panel includes a fiberglass insulation blanket and a barrier layer. The barrier layer is sealed around the fiberglass insulation blanket. Gas inside the barrier layer is evacuated such that the fiberglass insulation blanket is compressed.

16 Claims, 24 Drawing Sheets

(56) References Cited

U.S. PATENT DOCUMENTS

| | | |
|---|---|---|
| 5,749,254 A | 5/1998 | Hall, Jr. |
| 5,756,179 A | 5/1998 | Jutte |
| 5,791,551 A | 8/1998 | Parks et al. |
| 5,795,639 A | 8/1998 | Lin |
| 5,797,513 A | 8/1998 | Olinger et al. |
| 5,869,407 A | 2/1999 | Rusek, Jr. et al. |
| 5,875,599 A | 3/1999 | McGrath et al. |
| 5,897,932 A | 4/1999 | McGrath et al. |
| 5,971,198 A | 10/1999 | Olinger et al. |
| 5,987,833 A * | 11/1999 | Heffelfinger et al. ....... 52/406.2 |
| 6,878,427 B2 * | 4/2005 | Schmidt ................... D04H 1/54 428/71 |
| 2004/0180176 A1* | 9/2004 | Rusek, Jr. ............... E04B 1/803 428/69 |
| 2013/0084445 A1 | 4/2013 | Haley et al. |
| 2013/0266784 A1 | 10/2013 | Haley et al. |

OTHER PUBLICATIONS

Simmler et al., "Aging and service life of VIP in buildings", In: Proceedings of 7th International Vacuum Insulation Symposium, EMPA, Duebendorf, Switzerland, pp. 15-22 and 35-42 (2005).

Simmler et al., "Vacuum Insulation Panels, Study on VIP-components and Panels for Service Life Prediction of VIP in Building Applications (Subtask A)", HiPTI—High Performance Thermal Insulation, IEA/ECBCS Annex 39, 159 pages, Sep. 2005.

* cited by examiner

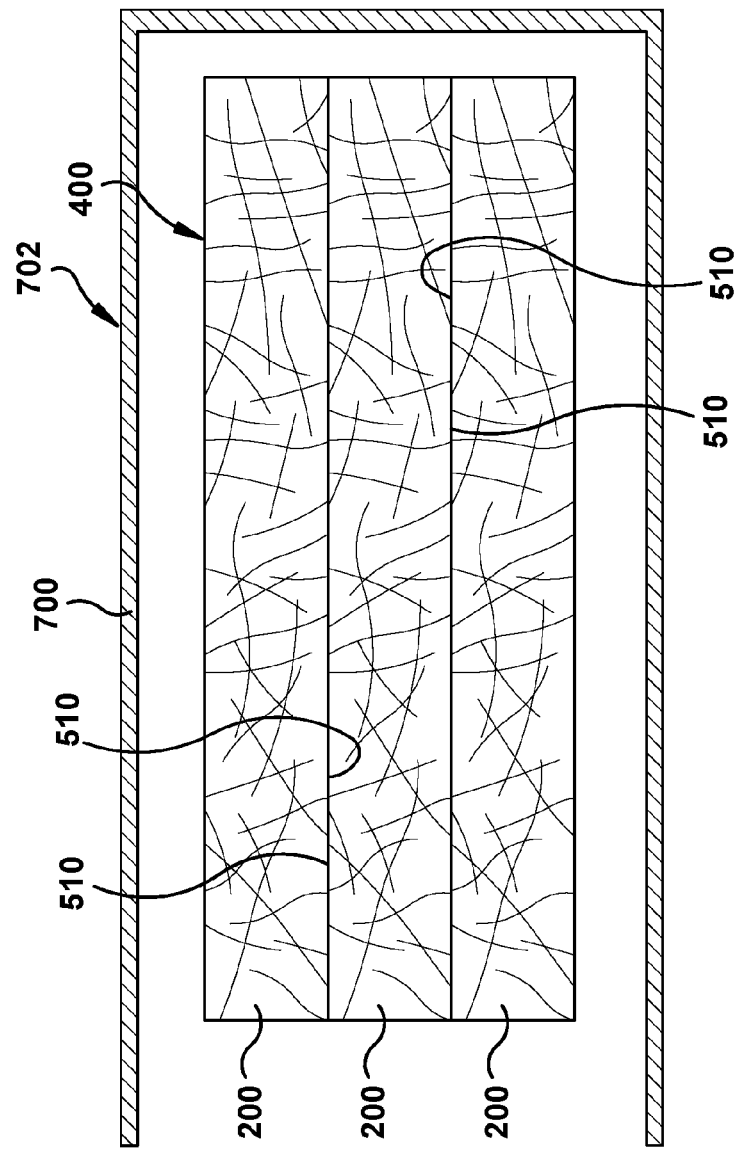

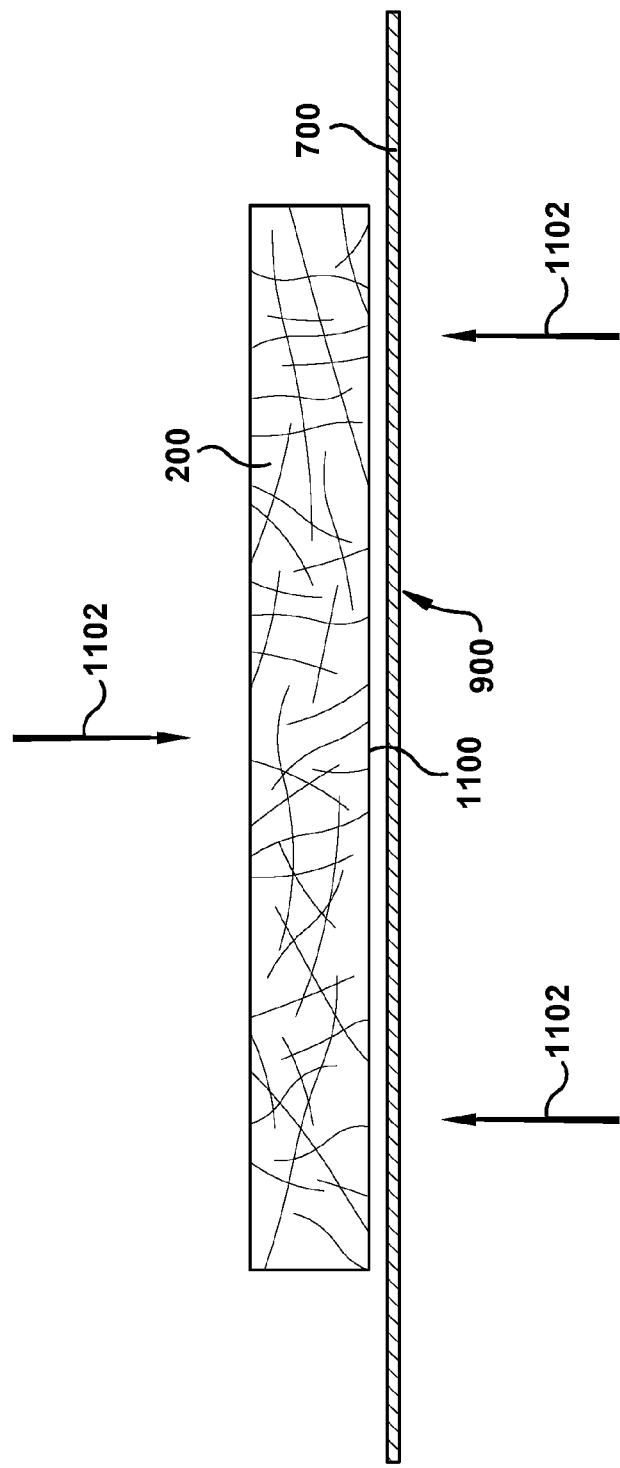

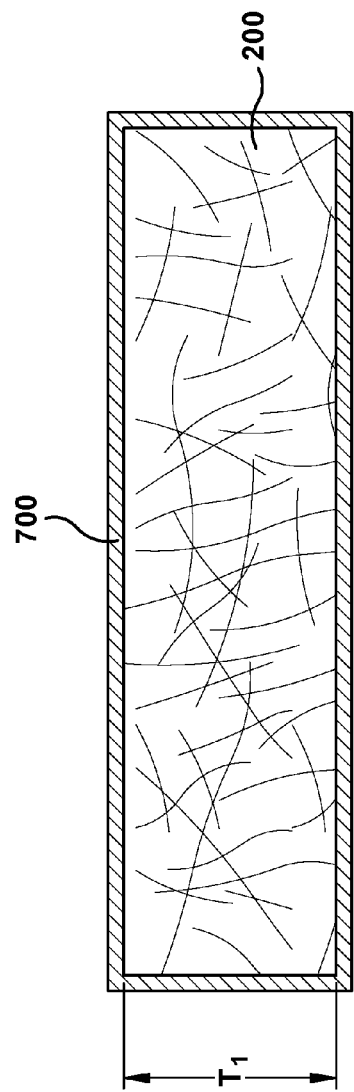
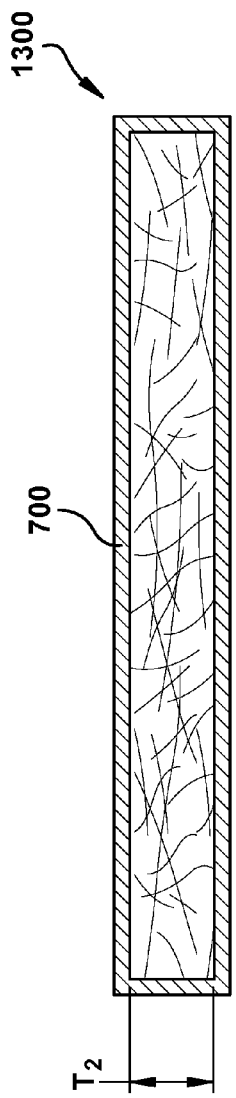
Fig. 13A
Fig. 13B

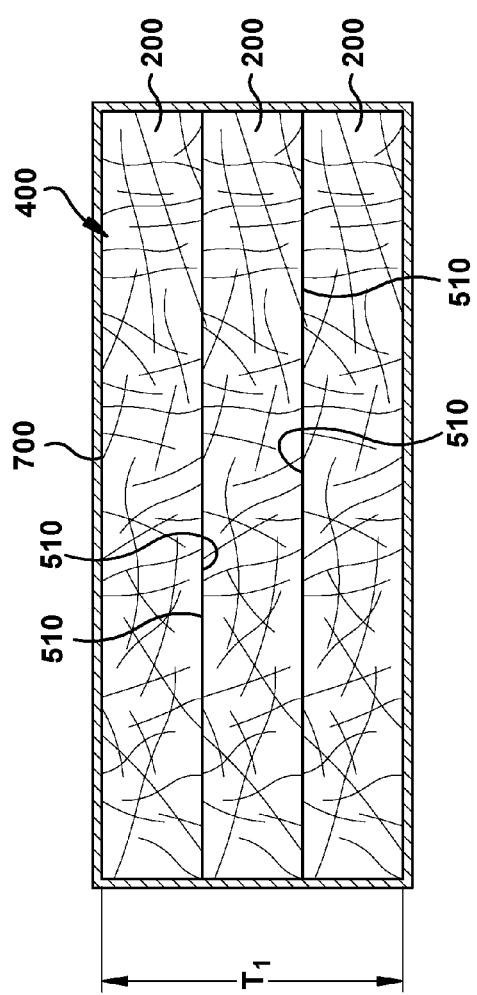
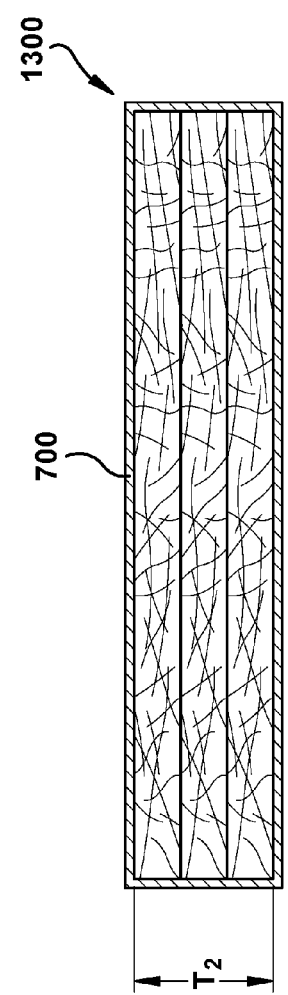
Fig. 14A
Fig. 14B

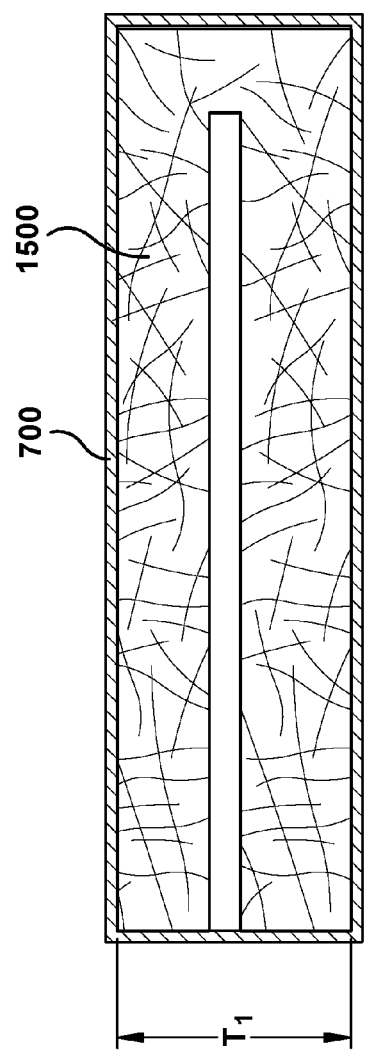
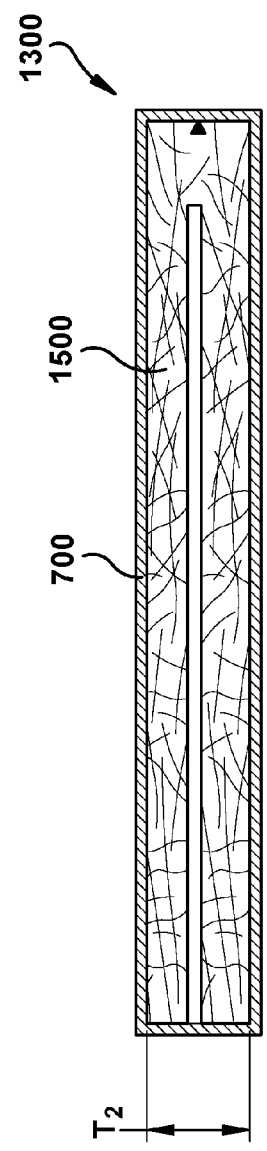
Fig. 15A
Fig. 15B

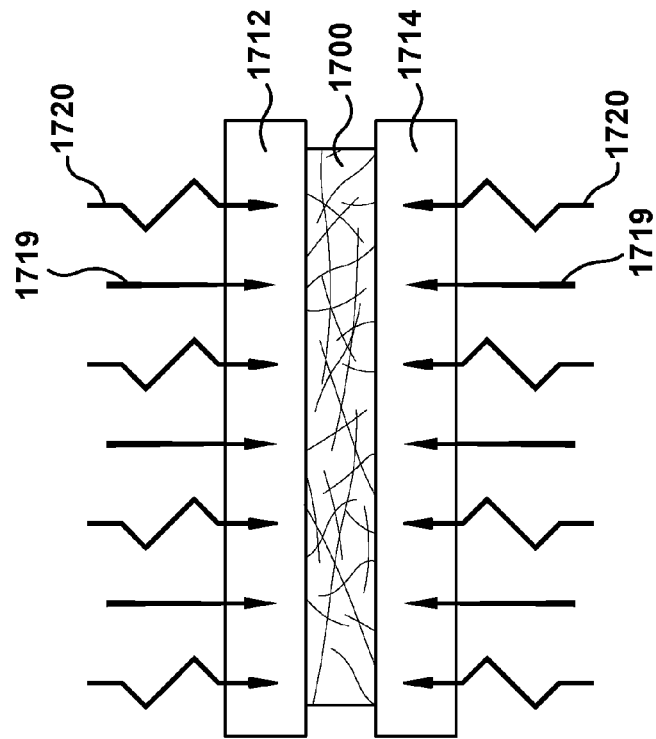
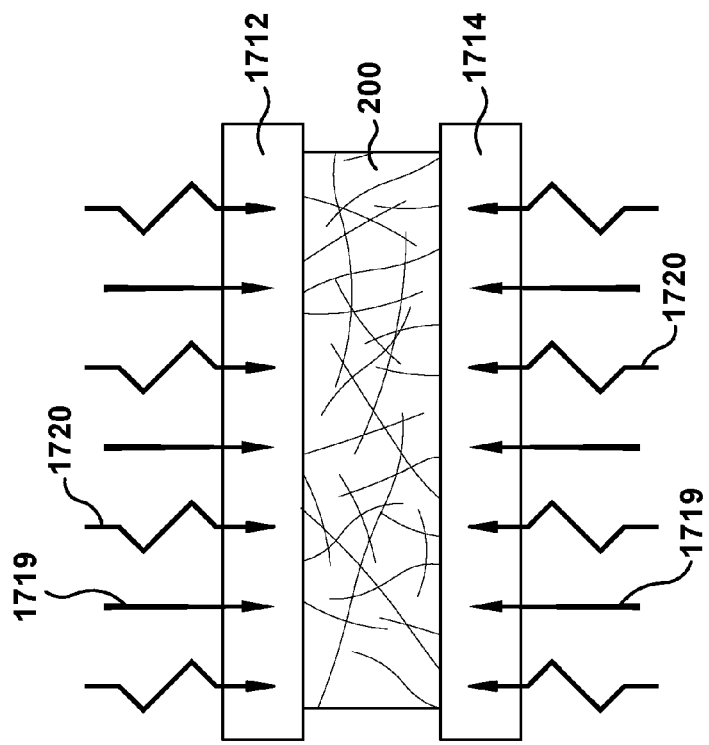

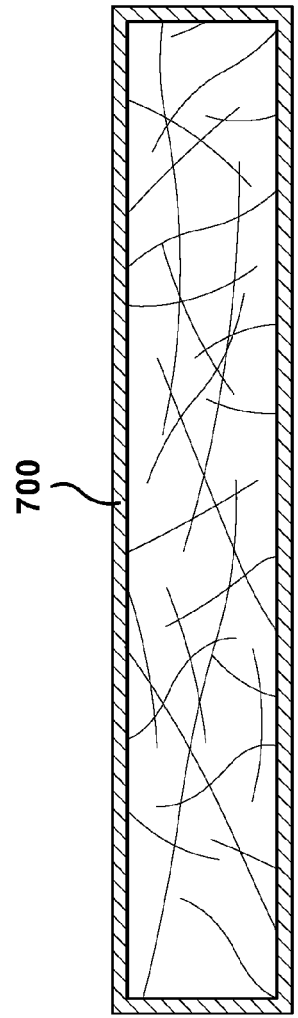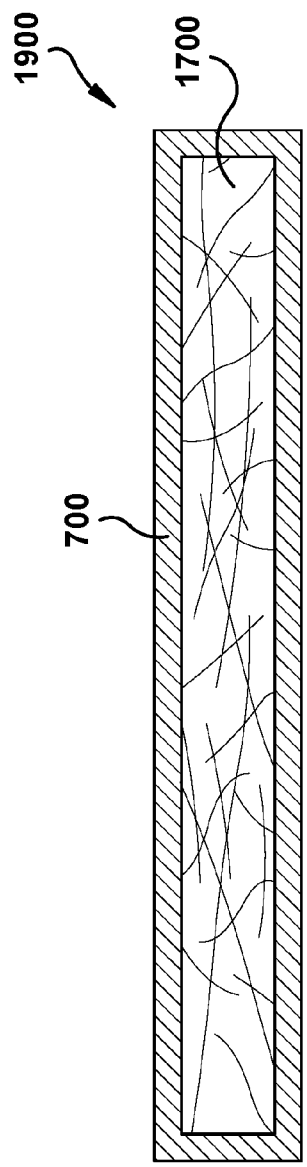
Fig. 19A
Fig. 19B

VACUUM INSULATED PANEL

BACKGROUND OF THE INVENTION

The present invention relates in general to insulation panels and, more particularly, to vacuum insulation panels.

Vacuum insulation panels are well known in the art and typically include a thermally insulating media which is contained within a sealed enclosure. The enclosure is evacuated to create a vacuum in the enclosure and thereby reduce heat transfer through the panel. These panels are used in many applications including refrigerator walls, oven walls, cryogenic vessels and other devices requiring high levels of thermal insulation.

A wide variety of insulating media have been used in vacuum insulation panels including conventional fiber glass wool and mixtures of conventional fiber glass wool with other materials. U.S. Pat. Nos. 5,090,981; 5,330,816; 5,795,639; and 5,869,407 describe some prior art vacuum insulated panels. U.S. Pat. Nos. 5,090,981; 5,330,816; 5,795,639; and 5,869,407 are incorporated herein by reference in their entirety.

SUMMARY

The present application discloses exemplary embodiments of vacuum insulated panels. In one exemplary embodiment, the vacuum insulated panel includes a fiberglass insulation blanket and a barrier layer. The barrier layer is sealed around the fiberglass insulation blanket. Gas inside the barrier layer is evacuated such that the fiberglass insulation blanket is compressed.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to provide examples of the principles of this invention.

FIGS. 8A and 8B schematically illustrate surrounding a multi-layer insulation blanket with a barrier layer;

FIGS. 11A and 11B schematically illustrate surrounding a folded insulation blanket with a barrier layer;

FIGS. 13A and 13B schematically illustrate compression of an insulation blanket by evacuating gas from inside the barrier layer;

FIGS. 14A and 14B schematically illustrate compression of a layered insulation blanket by evacuating gas from inside the barrier layer;

FIGS. 15A and 15B schematically illustrate compression of a folded insulation blanket by evacuating gas from inside the barrier layer;

FIGS. 17A and 17B schematically illustrate pre-heat densifying of the insulation blanket illustrated by FIG. 2;

FIGS. 18A and 18B schematically illustrate pre-heat densifying of a layered insulation blanket;

FIGS. 19A and 19B schematically illustrate compression of a densified insulation panel by evacuating gas from inside the barrier layer.

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

Figure 1:
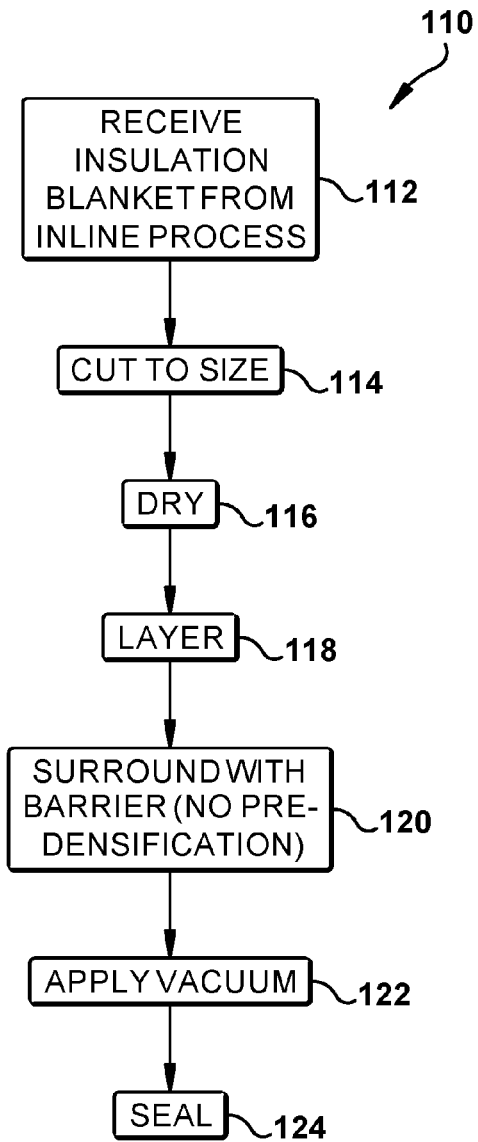
FIG. 1 is a flowchart that illustrates an exemplary embodiment of a method of making a vacuum insulated panel.

FIG. 1 illustrates an exemplary embodiment of a method 110 of making a vacuum insulated panel 1300 (See FIG. 13B). In the method 110, an insulation blanket is provided 112, optionally cut to size 114, dried 116, optionally layered 118, surrounded with a barrier 700 without pre-densification or molding of the insulation blanket, evacuated 122, and sealed 124 to form the vacuum insulated panel 1300.

Figure 2:
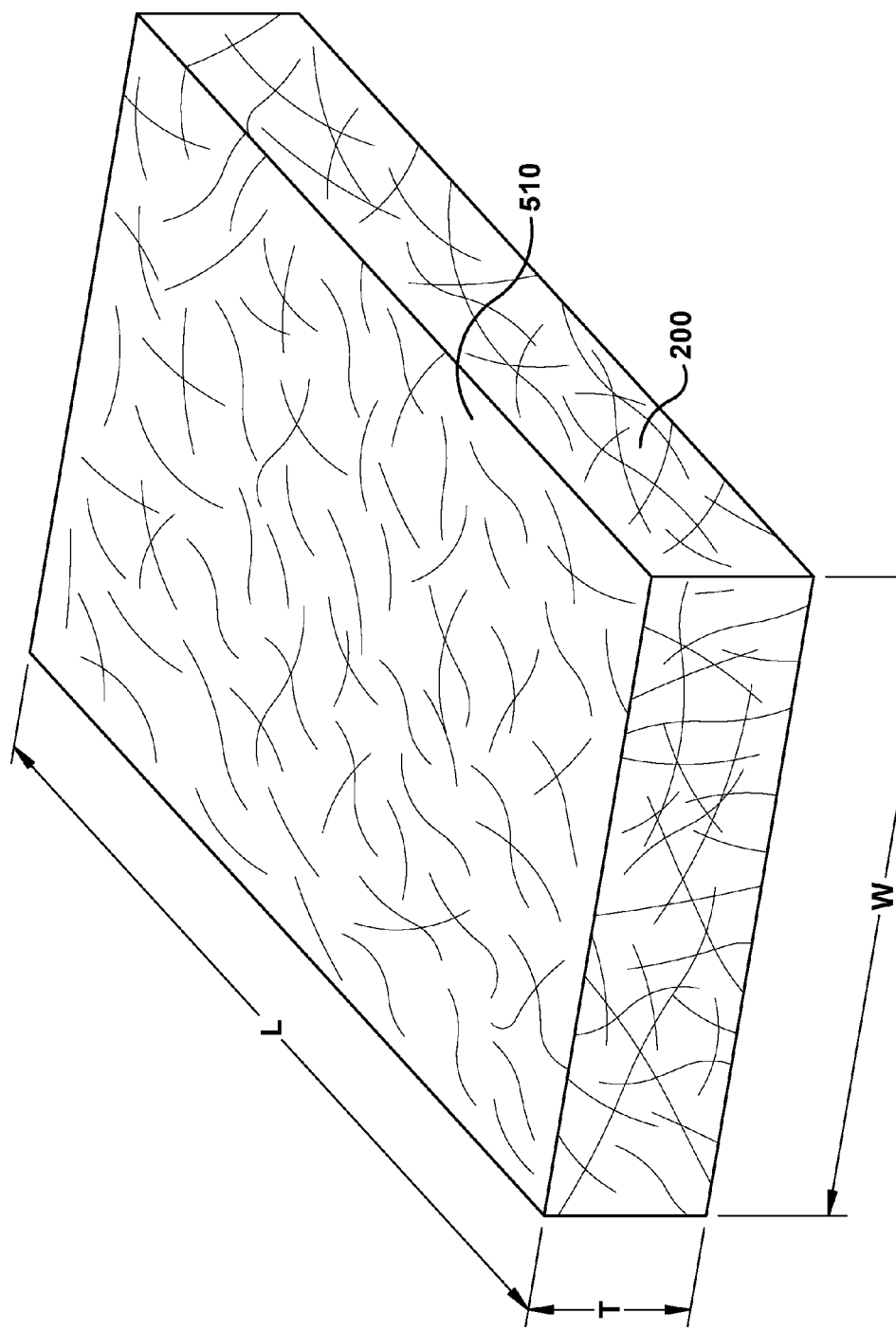
FIG. 2 is a schematic illustration of a piece of an insulation blanket used as a core in a vacuum insulated panel.

FIG. 2 illustrates an insulation blanket 200 that may be used to make the vacuum insulated panel 1300. The insulation blanket 200 can take a wide variety of different forms. For example, the insulation blanket may be any of the insulation blankets (or packs) and/or may be made according to any of the methods and/or may be made by any of the apparatus disclosed by U.S. patent application Ser. No. 13/632,895 (Filed Oct. 1, 2012—Pub. No. 2013-0084445) and Ser. No. 13/839,350 (Filed Mar. 15, 2013), which are incorporated herein by reference in their entirety.

Another insulation blanket 200 that may be used to make the insulation panel 1300 is Owens Corning ThermoRange® System (TRS) insulation. Properties of Owens Corning TRS insulation are as follows:

| Typical Physical Properties | | |
|---|---|---|
| Property | Test Method | Result |
| Surface Burning Characteristics | ASTM E 84 or UL 723 | Meeting 25/50 |
| Operating Temperature Range | ASTM C 411 | Up to 1,000° F. (538° C.) |

| Thermal Conductivity - "k", ASTM C 177 | | | | | |
|---|---|---|---|---|---|
| | Type | | | | |
| | TRS-10 | TRS-20 | TRS-30 | TRS-40 | TRS-50 |
| Density1 | | | | | |
| pcf | 1.02 | 1.26 | 1.76 | 2.5 | 3.71 |
| kg/m3 | 16.3 | 20.2 | 28.2 | 40.1 | 59.4 |
| Nominal "k" BTU in/hr"ft. 2"° F." | | | | | |
| 75° F. | 0.26 | 0.242 | 0.23 | 0.22 | 0.211 |
| 300° F. | 0.51 | 0.46 | 0.39 | 0.35 | 0.31 |
| 500° F. | 0.85 | 0.75 | 0.62 | 0.52 | 0.44 |
| Nominal "k" W/mK | | | | | |
| 23° C. | 0.037 | 0.035 | 0.033 | 0.032 | 0.031 |
| 149° C. | 0.074 | 0.066 | 0.056 | 0.05 | 0.045 |
| 260° C. | 0.123 | 0.108 | 0.089 | 0.075 | 0.063 |

| Sound Absorption Coefficient, ASTM C 423 - Type A Mounting1 Thickness Octave Band Center Frequencies, Hz. | | | | | | | | | |
|---|---|---|---|---|---|---|---|---|---|
| Product | (Inches) | 125 | 250 | 500 | 1000 | 2000 | 4000 | NRC | SAA |
| TRS-10 | 1 | 0.09 | 0.31 | 0.65 | 0.85 | 0.9 | 0.9 | 0.7 | 0.68 |
| TRS-10 | 2 | 0.18 | 0.8 | 1.11 | 1.03 | 0.97 | 1.01 | 1 | 0.97 |
| TRS-20 | 1 | 0.17 | 0.45 | 0.84 | 0.94 | 0.96 | 0.93 | 0.8 | 0.8 |
| TRS-20 | 2 | 0.25 | 0.83 | 1.17 | 1.09 | 0.98 | 1.01 | 1 | 1.01 |
| TRS-30 | 1 | 0.13 | 0.39 | 0.77 | 0.94 | 1.01 | 0.99 | 0.8 | 0.78 |
| TRS-30 | 2 | 0.25 | 0.87 | 1.17 | 1.12 | 1.04 | 1.07 | 1.05 | 1.05 |
| TRS-40 | 1 | 0.08 | 0.34 | 0.81 | 0.98 | 1.03 | 1.03 | 0.8 | 0.79 |
| TRS-50 | 2 | 0.25 | 1.06 | 1.18 | 1.09 | 1.05 | 1.05 | 1.1 | 1.08 |

Another insulation blanket 200 that may be used to make the insulation panel 1300 is Owens Corning GEM® insulation. Properties of Owens Corning GEM insulation are as follows:

| Thermal Conductivity | | | | | | | |
|---|---|---|---|---|---|---|---|
| | Density | | Nominal k, Btu · in/hr · ft$_2$ ° F. | | | Nominal k, W/mK | | |
| Type | lb/ft$_3$ | kg/m$_3$ | 75° F. | 300° F. | 500° F. | 23° C. | 149° C. | 260° C. |
| GEM - B | 2.7 | 42.43 | 0.22 | 0.34 | 0.48 | 0.032 | 0.049 | 0.069 |
| GEM - C | 4 | 62.86 | 0.21 | 0.31 | 0.44 | 0.031 | 0.045 | 0.063 |
| GEM - D | 5 | 78.58 | 0.21 | 0.3 | 0.42 | 0.031 | 0.044 | 0.06 |

In one exemplary embodiment, the insulation blanket 200 is formed in a dry process. That is, the fibers that form the blanket 200 are dry when they are formed into a web or a pack, not wet laid and then dried or molded. In one exemplary embodiment, the blanket 200 is binderless. That is, binders are not used to hold the fibers of the insulation blanket together. The term binderless is explained in detail in U.S. patent application Ser. Nos. 13/632,895 and 13/839,350. In another exemplary embodiment, the fibers of the blanket 200 are held together by a dry binder. In one exemplary embodiment, the fibers or layers of fibers of the blanket 200 hare held together by mechanically entangling, such as by needling.

In one exemplary embodiment, the blanket 200, even after the drying step 116, that are inserted into the barrier 700 to make the vacuum insulated panels are much more flexible than the rigid cores that are typically inserted into barriers to make vacuum insulated panels. For example, in one exemplary embodiment, the dried blanket 200 can be draped over the back of a chair, a yardstick supported at its ends, or other similar surface and will hang down from the surface. That is, the dried blanket 200 has the flexibility properties of a traditional fiberglass insulation blanket, while cores that are typically inserted into barriers to make vacuum insulated panels are rigid board structures. In one exemplary embodiment, compressive strength is an indicator of flexibility of a fiberglass blanket 200 or board. A high compressive strength is indicative of a rigid fiberglass product and a low compressive strength is indicative of a flexible product. Highly dense (20 pcf to 30 pcf) glass boards have a compressive strength of 1500 lb/ft2 to 3000 lb/ft2. Also, a dense fiberglass Owens Corning 700-series board has a compressive strength of 46 lb/ft2 at 10% deformation. In one exemplary embodiment, the compressive strength of the blanket 200 is significantly less than a dense fiberglass Owens Corning 700-series board, such as ½ or less or ¼ or less of the compressive strength of the Owens Corning 700-series board. For example, the compressive strength of the fiberglass blanket may be less than 15 lb/ft$^2$, such as about 11 lb/ft$^2$ or less for a non-densified glass with a rough density of 2 pcf.

In one exemplary embodiment, the blanket 200 is produced 112 in-line with the remainder of the steps required to make the vacuum insulated panel 1300. That is, in the in-line process, the fibers are formed, processed to form a blanket 200, and the blankets are used to make vacuum insulation panels all at the same plant. Fibers or blankets 200 are not shipped from one source to another facility where vacuum insulation panels 1300 are formed in an in-line continuous process. In another exemplary embodiment, the vacuum insulation panels 1300 are not produced in-line with the blankets 200. Rather, the blankets 200 are formed at one or more fabrication sites and shipped to a vacuum insulation panel fabrication site where the vacuum insulation panels are made.

In one exemplary embodiment, the area weight per square foot of the insulation blanket is from 0.1 lb/sf to 0.4 lb/sf. In one exemplary embodiment, the blankets 200 that are inserted into the barrier 700 to make the vacuum insulated panels are much less dense that the cores that are typically inserted into barriers to make vacuum insulated panels. In one exemplary embodiment, the density of the blanket 200 is 2.5 pcf to 6 pcf. In one exemplary embodiment, the initial R value of the blanket 200 is 4 to 5 per inch. In one exemplary embodiment, the blanket has an open cell structure with a porosity wt % of greater than 90% by area. In one exemplary embodiment, the blanket 200 has a porosity wt % of between 90 and 98% by area. In one exemplary embodiment, the loss on ignition (LOI) of the blanket 200 is less than 0.5%.

The following table provides examples of airflow resistance and airflow resistivity for two undensified blankets 200, three densified blankets, and a traditional densified wet laid vacuum insulation panel core. In one exemplary embodiment, the air flow resistance of an undensified blanket 200 is 500-1500 mks Rayls and/or an airflow resistivity of 25,000 to 75,000 mks Rayls/m. In one exemplary embodiment, the air flow resistance of a densified blanket 200 is 5000-20000 mks Rayls and/or an airflow resistivity of 150,000 to 1,000,000 inks Rayls/m.

In one exemplary embodiment, the fibers of the blanket 200 are oriented to optimize thermal conductivity in the direction of the thickness T of the insulation blanket. In one exemplary embodiment, the thermal conductivity of the blanket in the direction of the thickness is better than the thermal conductivity of the blanket in the direction of the length or width of the blanket. This is achieved by making the blanket that is comprised of glass fibers that are located in generally parallel planes that are oriented about 90 degrees to the direction of heat flow (i.e. the direction of the thickness of the blanket). In one exemplary embodiment, a ratio $R_K$ of the thermal conductivity $K_T$ in the direction of the thickness T of the blanket to the thermal conductivities $K_W + K_L$ in the direction of the length L and width W is:

$$R_K = \frac{K_T}{(K_W + K_L)/2} > 1.$$

Referring back to FIG. 1, in an exemplary embodiment the blanket 200 is cut 114 to the appropriate size for the vacuum insulated panel 1300. The blanket 200 may be cut to size in a wide variety of different ways. In another exemplary embodiment, the blanket 20 is made in appropriately sized pieces and does not need to be cut.

Figure 3B:
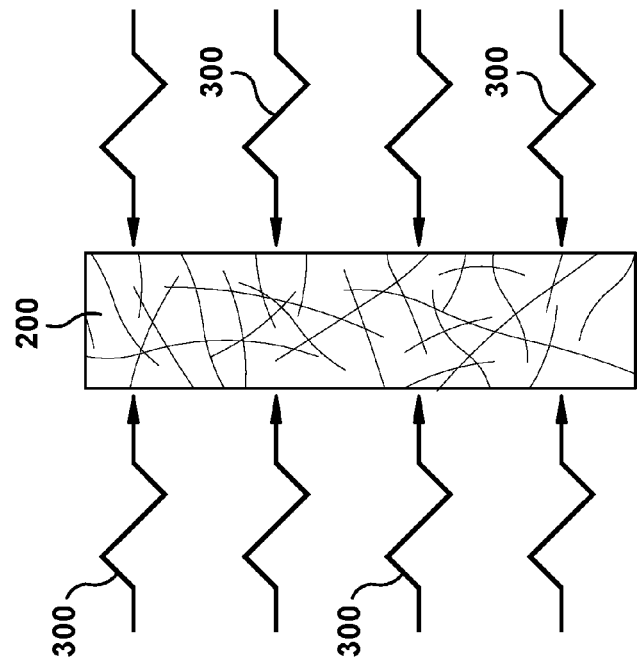
FIG. 3B schematically illustrates drying the insulation blanket illustrated by FIG. 2 in a vertical orientation.
Figure 3A:
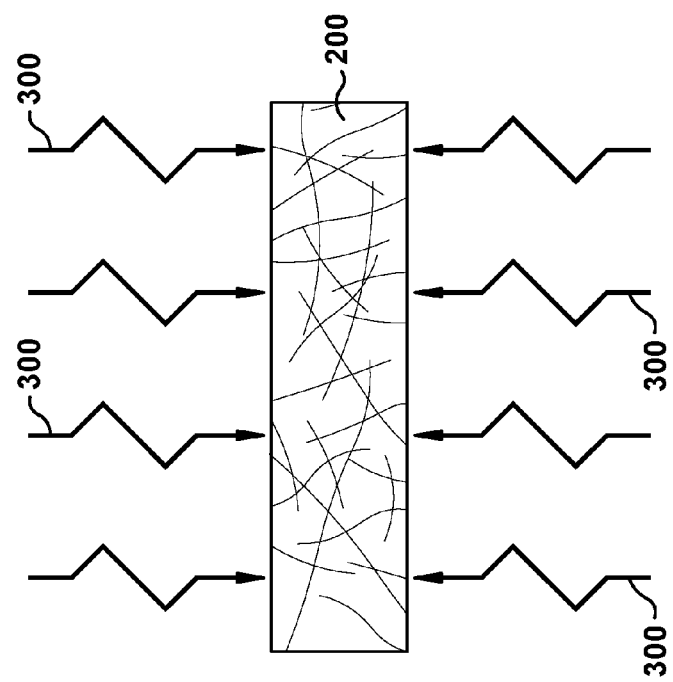
FIG. 3A schematically illustrates drying the insulation blanket illustrated by FIG. 2 in a horizontal orientation.

Referring to FIGS. 1 and 3, the insulation blanket 200 is dried 116 as indicated by arrows 300. The insulation blanket may be dried in a wide variety of different ways. In an exemplary embodiment, after drying 115, the moisture content remaining in the blanket is 0-0.5% by weight of the blanket after drying. Examples of ways to dry the blanket 200 include, but are not limited to, conventional heating, radio frequency heating, microwave heating, and the like. The blanket may be heated to temperatures greater than or equal to 600 degrees F., such as from 600 degrees F. to 900 degrees F., for fifteen minutes to two hours using conventional heating. When radio frequency and/or microwave heating is employed, the time required to dry the blanket 20 is less than five minutes, such as two to three minutes. FIG. 3A illustrates that the blanket 200 may be dried while the blanket is in a horizontal orientation. FIG. 3B illustrates that the blanket 200 may be dried while the blanket is in a vertical orientation.

Figure 4:
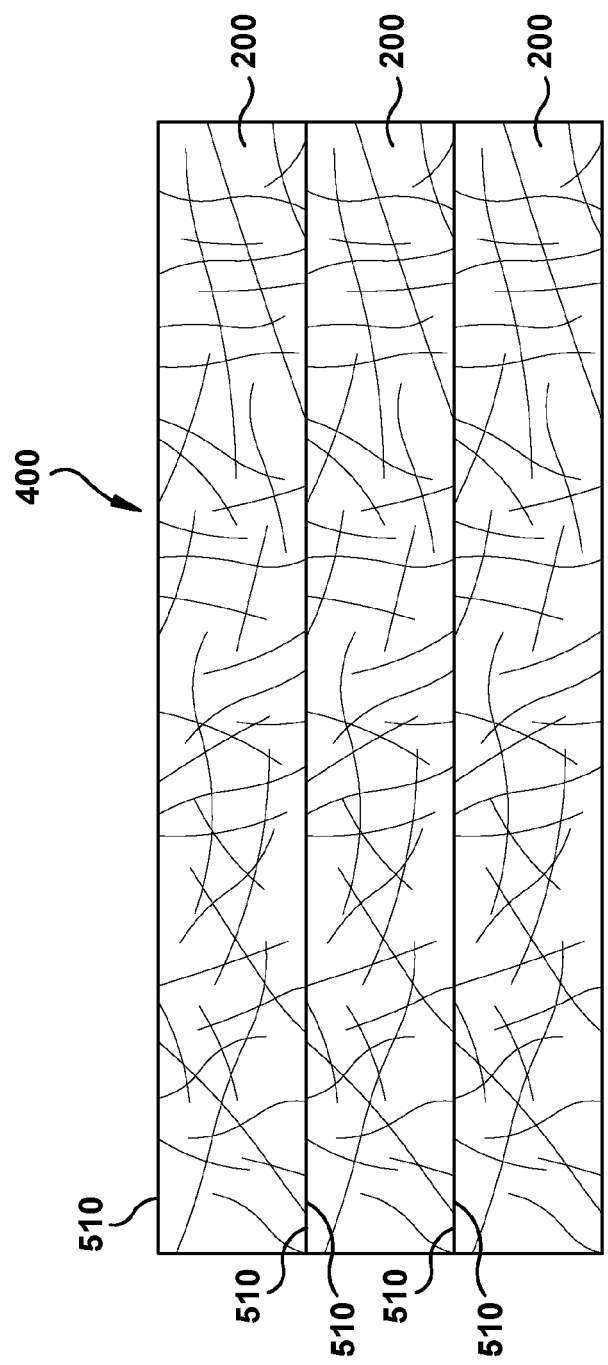
FIG. 4 schematically illustrates a plurality of layers of the insulation blanket illustrated by FIG. 2.

Referring to FIGS. 1 and 4, in one exemplary embodiment, the insulation blanket 200 is layered. For example, multiple layers of insulation blanket 200 can be placed on top of one another to make a multi-layer blanket 400. This layering allows the thickness of the vacuum insulated panel 1300 to be changed by adding layers of the same or different thickness. The vacuum insulated panel can also be contoured by providing more or less layers of the same or different

| | Average Values of Measured Data | | | | | |
|---|---|---|---|---|---|---|
| Sample Summary Sample | Weight (g) | Thickness (mm) | Density (Kg/m$^2$) | Area Density (Kg/m$^3$) | Specific Airflow Resistance (mks Rayls) | Airflow Resistivity (mks Rayls/m) |
| Undensified Blanket #1 | 5.04 | 21.75 | 0.64 | 29.49 | 769.12 | 35360.23 |
| Undensified Blanket #2 | 6.36 | 17.78 | 0.81 | 43.90 | 1185.96 | 66702.00 |
| Densified Blanket #1 | 21.35 | 32.18 | 2.72 | 84.84, | 6376.02 | 198124.94 |
| Densified Blanket #2 | 29.98 | 19.20 | 3.82 | 199.04 | '12007.71' | 625461.53 |
| Densified Blanket #3 | 36.02 | 21.47 | 4.59 | 213.59 | 18723.44 | 872014.75 |
| Current Densifed Wet Laid Core | 6.00 | 4.95 | 0.76 | 154.30 | 12280.85 | 2479476.67 | thickness in various areas of the panel. The layering can be accomplished in a wide variety of different ways. Discrete, cut blanket pieces can be stacked on top of one another. The blanket pieces can be made to include layers when they are formed as described by U.S. application Ser. Nos. 13/632, 895 and 13/839,350 or pre-formed elongated lengths of insulation blankets 200 can be lapped or cross-lapped to form layers. In one exemplary embodiment, the vacuum insulated panel 1300 has from one to ten layers of blankets, such as between one and four layers of insulation blankets. However, the vacuum insulation panel 1300 can have any number of layers.

Figure 5:
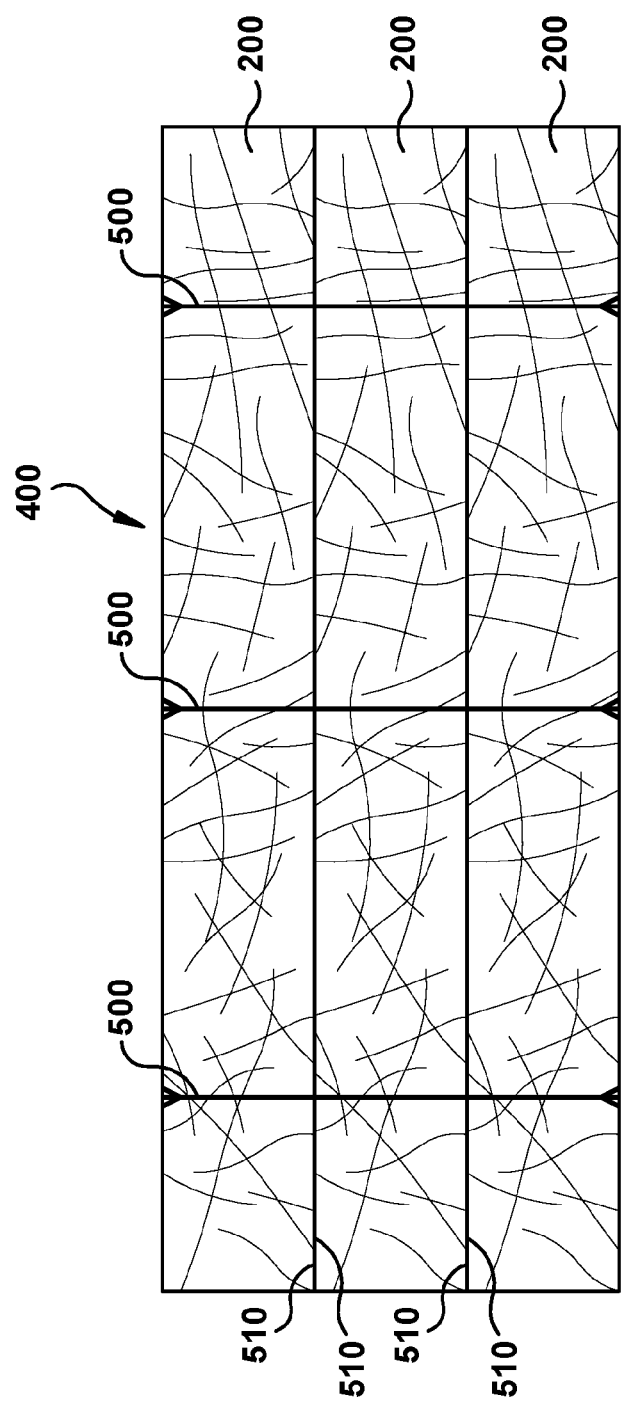
FIG. 5 schematically illustrates a plurality of layers of the insulation blanket illustrated by FIG. 2 held together by a mechanical fastening arrangement.

FIG. 5 illustrates that the blankets 200 of a multilayer blanket 400 can be connected together to prevent the blankets 200 from moving with respect to one another. The blankets 200 can be connected together in a wide variety of different ways. For example, the blankets 200 may be connected by stitches 500 or other mechanical fasteners as shown, adding non-outgassing adhesives, ultrasonic, heat or laser assisted spot bonding, etc. In another exemplary embodiment, the blankets 200 are not connected together. In one exemplary embodiment, outer surfaces 510 of the blankets 200 are rough and friction prevents the blankets from sliding or shifting relative to one another. The blankets 200 can be cut and/or embossed to add friction and prevent the sliding of the blankets relative to one another.

Figure 6:
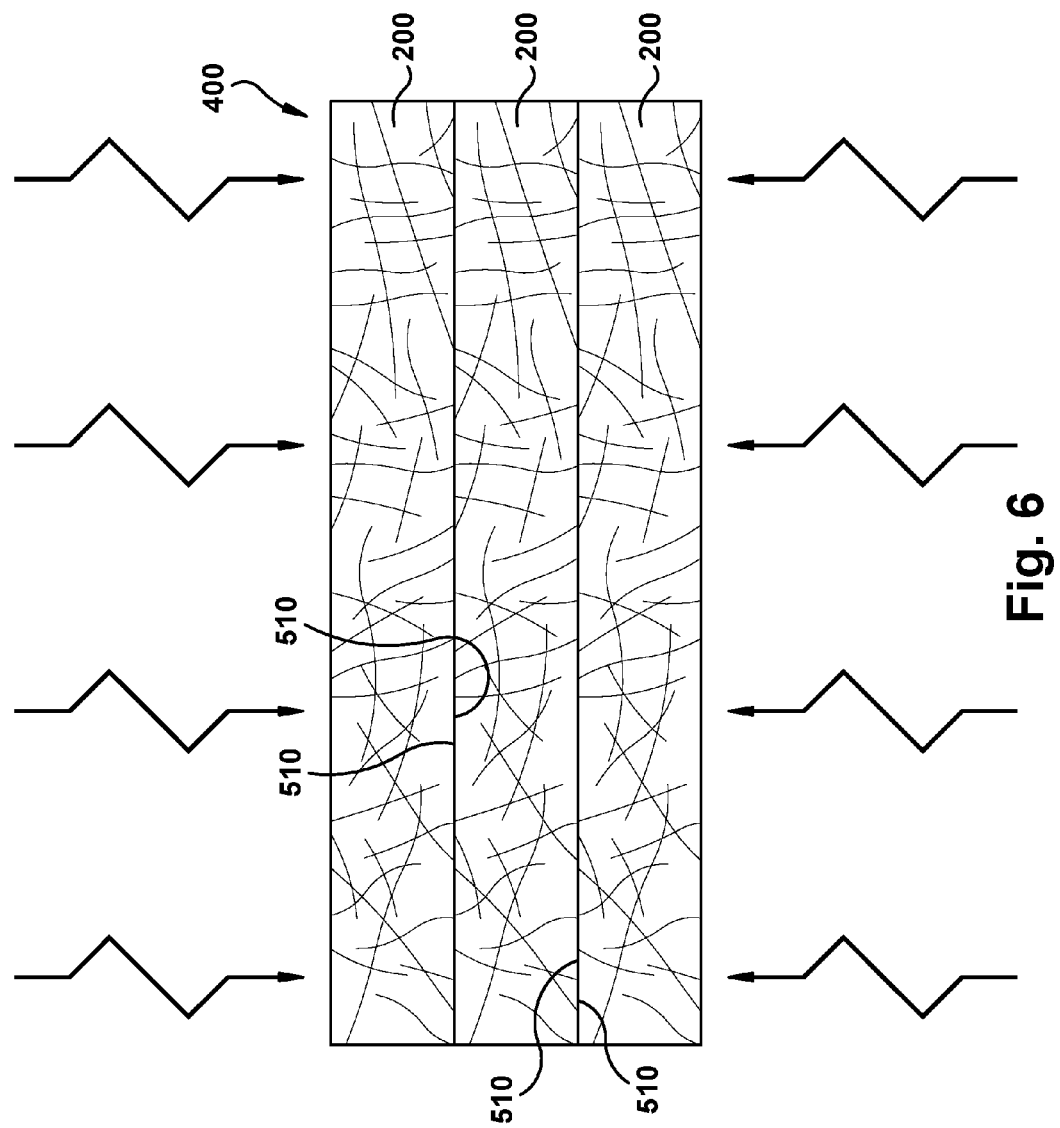
FIG. 6 schematically illustrates drying a layered insulation blanket.

FIG. 6 illustrates that the insulation blankets 200 can be dried 116 as indicated by arrows 300 after layering. This drying may be instead of or in addition to the drying of the single layer blankets 200 that make up the layered blanket 400. The layered insulation blankets may be dried in any of the ways described above. In an exemplary embodiment, after drying 115, the moisture content remaining in the blanket is 0-0.5% by weight of the blanket after drying.

Referring to back to FIG. 1, the blanket 200 or layered blankets 400 are surrounded 120 with a barrier layer 700. The barrier layer may take a wide variety of different forms. The barrier layer may be a flexible barrier film material which is impervious to the passage of air and other gases. The enclosure preferably comprises a multi-ply, heat sealable metalized polymer film. The enclosure may also comprise polymer films bonded to aluminum foil, and mixed or pure polymer films. Suitable high gas barrier polymer films for use include, but are not limited to, polyester terephthalate (PET), polyvinylidene chloride, and acrylonitrile (PAN). Films of this type with even higher barrier properties may be made by aluminum metallizing or sputtering techniques using any suitable metal, and then bonding with the sealing film layer. Metal foils can be used in place of metallizing or sputtering. Suitable sealing film layers include polyethylene, polypropylene, and polyester co-copolymer films. Barrier layers 700 are available from Hanita Coatings RCA Ltd (Kotlav), which offers single laminate construction of metallized Polyester, bi-laminate construction of metallized Polyester with an optional protective polypropylene layer, tri-laminate construction of metallized Polyester with an optional protective polypropylene layer, and metallized PET laminates combining Aluminium Foil.

Figure 7A:
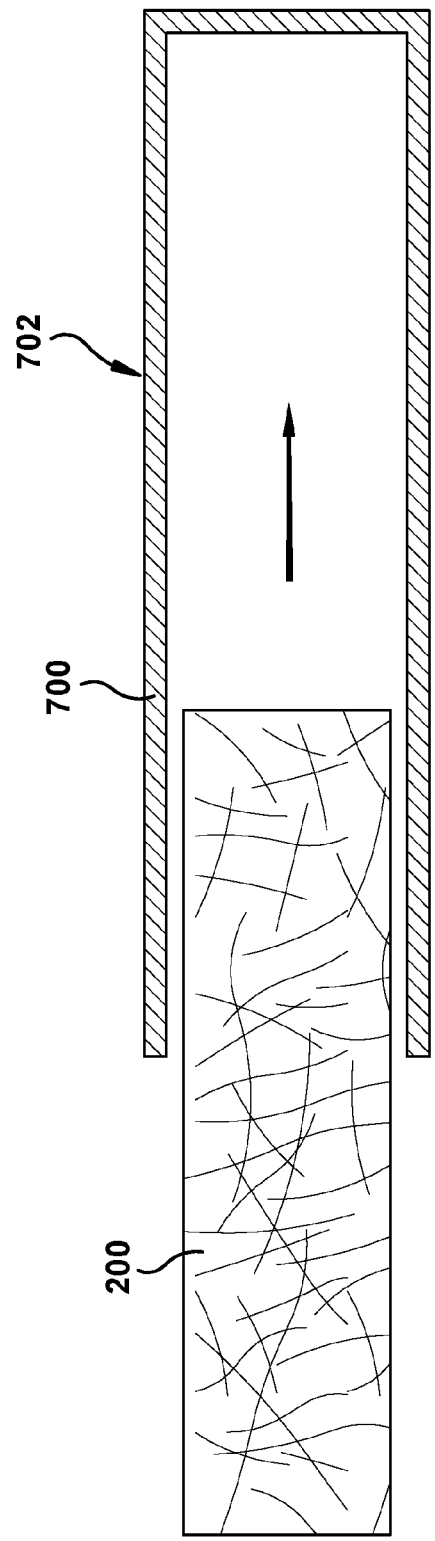
FIGS. 7A and 7B schematically illustrate surrounding an insulation blanket with a barrier layer.
Figure 7B:
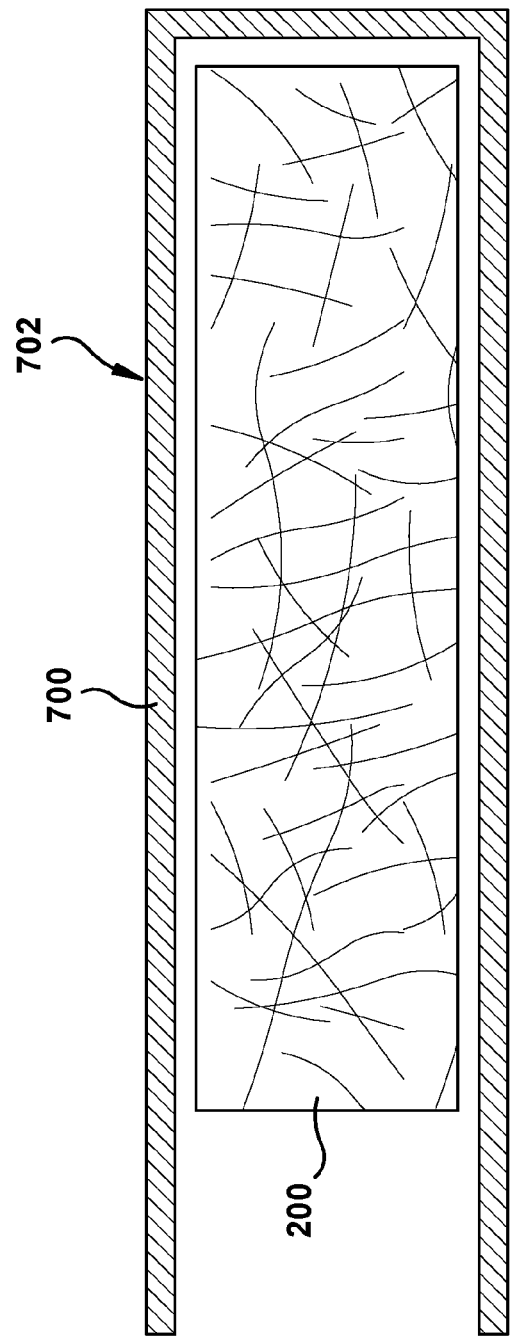
Figure 8A:
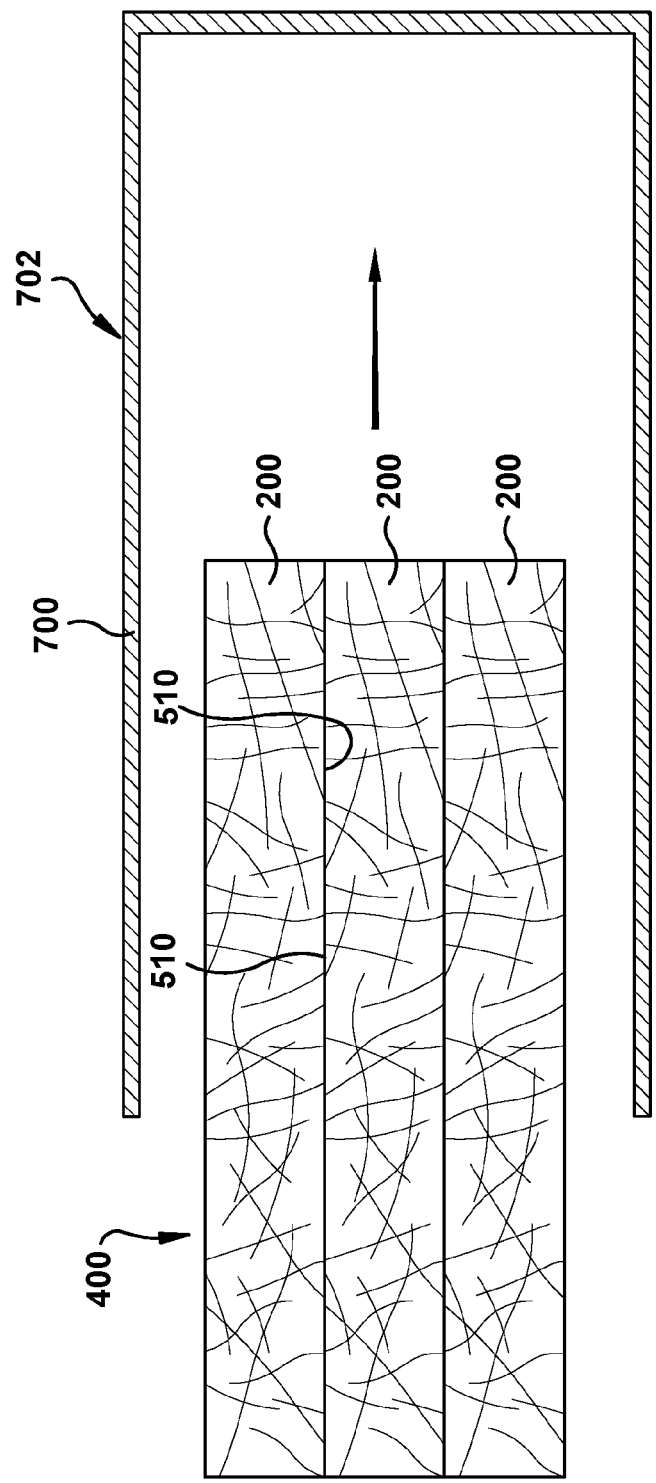
Figure 9:
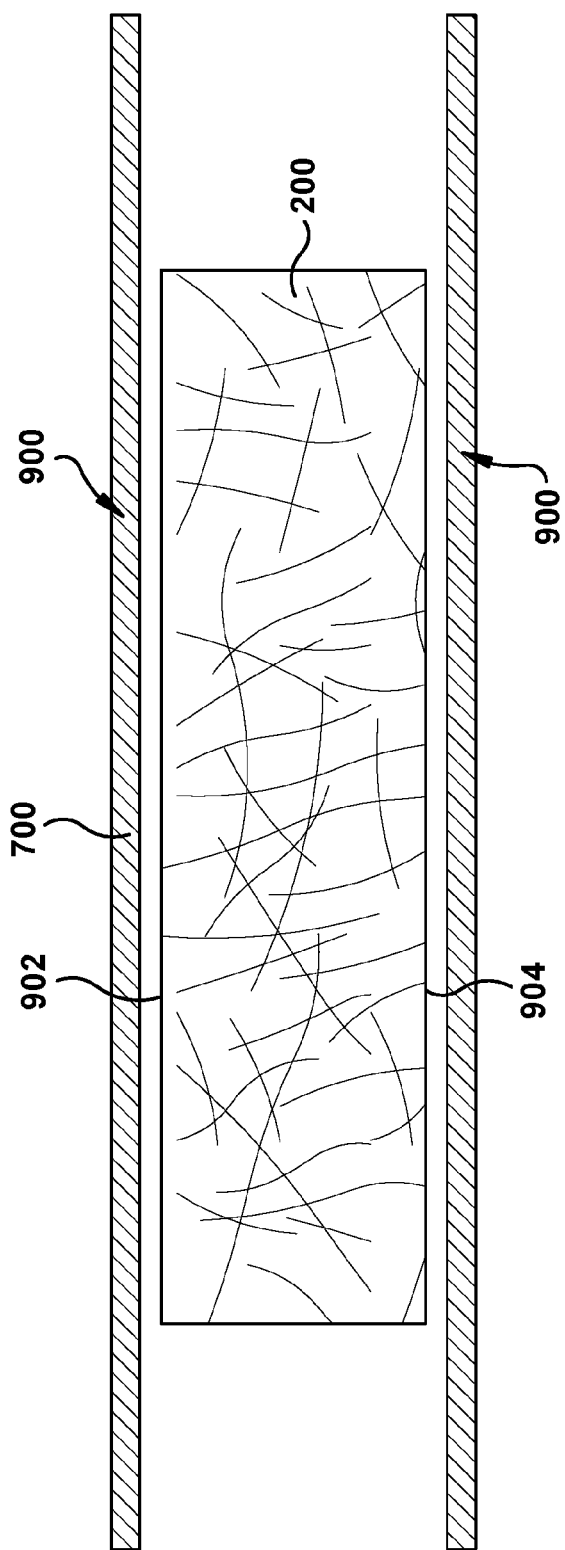
FIG. 9 schematically illustrates surrounding an insulation blanket with a barrier layer.
Figure 10:
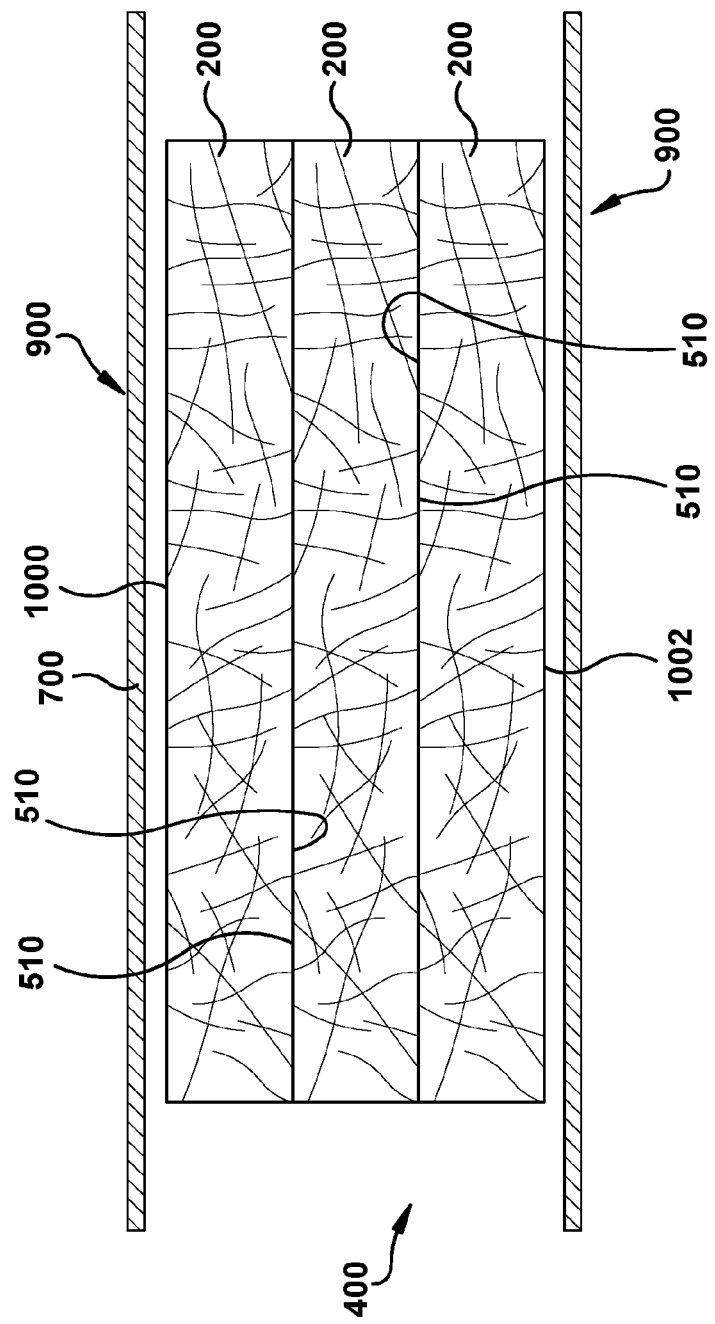
FIG. 10 schematically illustrates surrounding a multi-layer insulation blanket with a barrier layer.
Figure 11B:
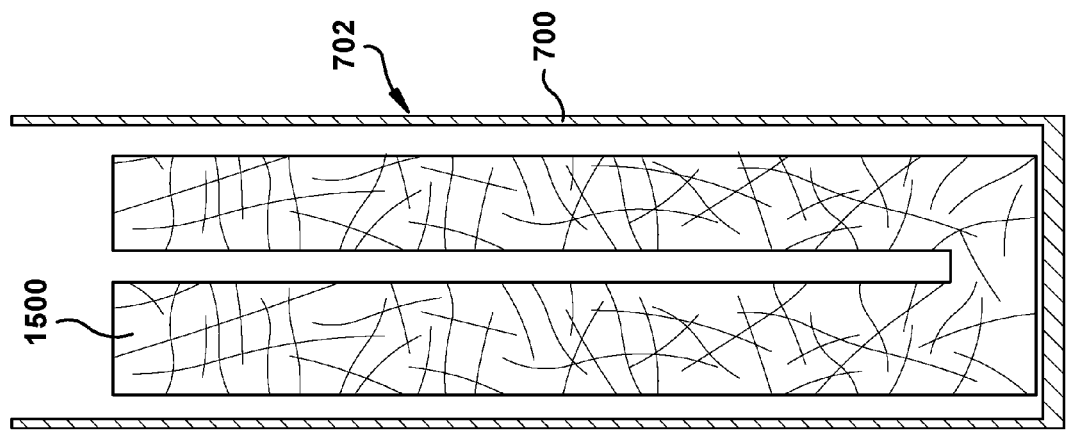
Figure 12A:
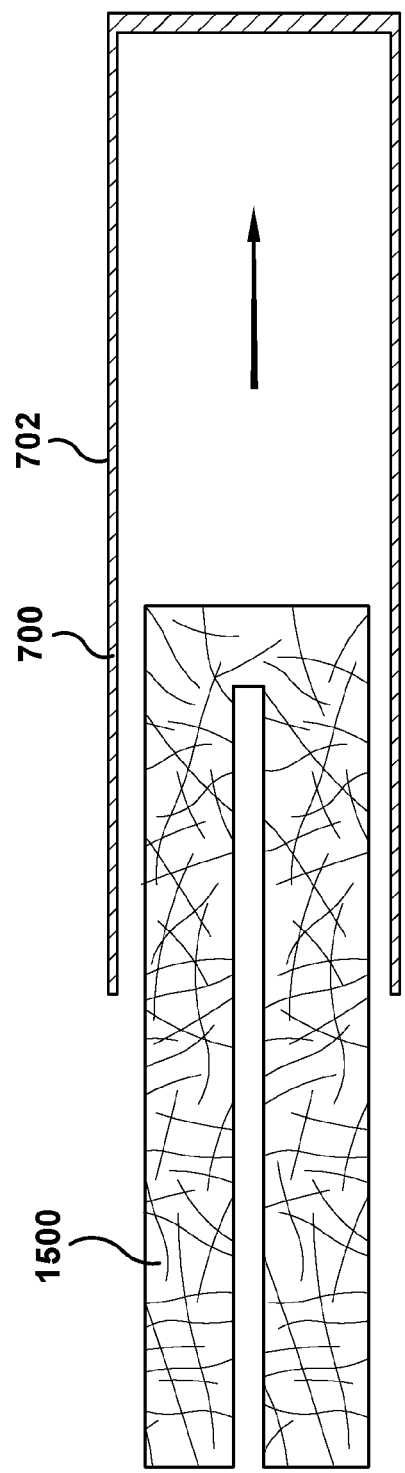
FIGS. 12A and 12B schematically illustrate surrounding a folded insulation blanket with a barrier layer.
Figure 12B:
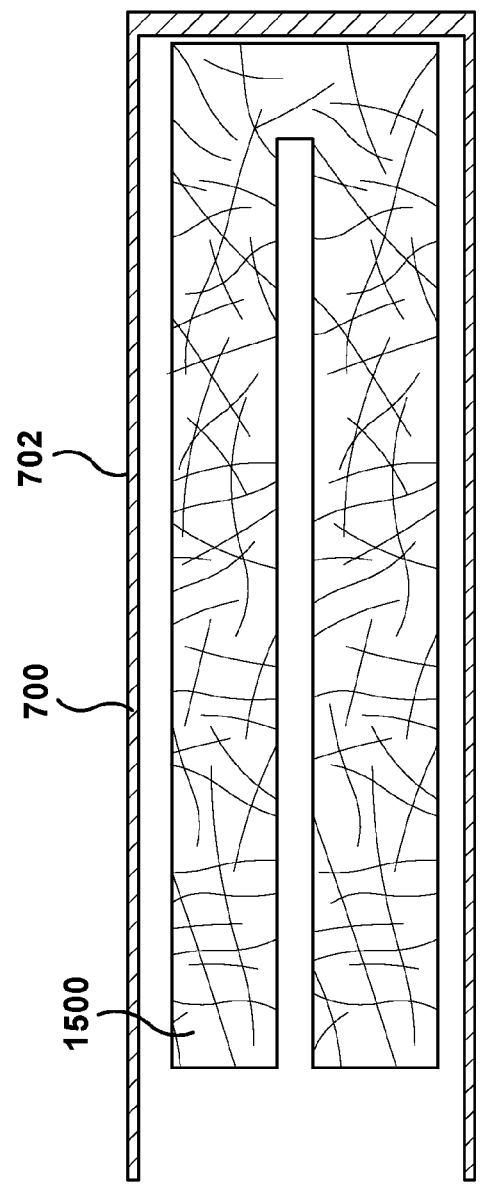

The barrier layer 700 may have a wide variety of different forms. In the examples illustrated by FIGS. 7A, 7B, 8A, 8B 12A, and 12B, the barrier layer 700 is in the form of a bag or a pouch 702. In the example illustrated by FIGS. 7A and 7B, a single layer blanket 200 is inserted into the pouch 702. In the example illustrated by FIGS. 8A and 8B, a layered arrangement 400 of blankets 200 are inserted into the bag or pouch. In the example illustrated by FIGS. 12A and 12B, a single layer blanket 200 is folded and then inserted into the pouch 702. In the example illustrated by FIGS. 9, 10, 11A, and 11B, the barrier layer 700 is in the form of a sheet or sheets 900. In the example illustrated by FIG. 9, a sheet 900 is applied on each side 902, 904 of a single layer blanket 200. In the example illustrated by FIG. 10, a sheet 900 is applied on each side 1000, 1002 of a layered arrangement 400 of blankets 200. In the example illustrated by FIGS. 11A and 11B, the sheet 900 is applied on one side 1100 of the blanket 200 and then the sheet and blanket are folded as indicated by arrows 1102.

Referring to FIGS. 1, 13A, and 13B, gas inside the barrier 700 evacuated 122. The air may be evacuated from the blanket 200 using conventional methods in which air is evacuated in a vacuum chamber. However, any evacuation method can be employed. Referring to FIGS. 13A and 13B, the initial thickness T1 of the blanket is reduced by the evacuation step 122 to a compressed thickness T2. In an exemplary embodiment, the thickness T1 is reduced by 40-80%, such as 50-65%, or 60-70% to the compressed thickness T2. This reduction of thickness is significantly greater than the reduction of thickness that occurs when the vacuum insulated panel is pre-densified. In an exemplary embodiment, the density of the blanket 200 after being compressed by the barrier 700 due to the evacuation 122 of gas is lower than cores of traditional vacuum insulated panels. For example, the density of the blanket 200 after being compressed by the barrier 700 due to the evacuation 122 of gas may be from 3-10 lb/ft$^3$, such as 5-7 lb/ft$^3$.

In one exemplary embodiment, the vacuum insulation panel 1300 expands if the barrier 700 is cut, torn, or leaks. For example, the vacuum insulation panel may return to substantially the initial thickness T1. This expanding or springing back is due to the fact that the blanket 200 is not heat densified or molded. In an exemplary embodiment, the thickness of the vacuum insulated panel 1300 increases by more than 40%, more than 50%, more than 75%, more than 100%, more than 125%, more than 150%, or even more than 200% when the barrier 700 is cut, torn, or leaks.

FIGS. 14A and 14B illustrate a layered blanket 400 being compressed by the barrier 700 when air is evacuated. The initial thickness T1 of the layered blanket 400 is reduced by the evacuation step 122 to a compressed thickness T2. In an exemplary embodiment, the thickness T1 is reduced by 40-80%, such as 50-65%, or 60-70% to the compressed thickness T2. In an exemplary embodiment, the density of the layered blanket 400 after being compressed by the barrier 700 due to the evacuation 122 of gas may be from 3-10 lb/ft$^3$, such as 5-7 lb/ft$^3$.

In one exemplary embodiment, the vacuum insulation panel 1300 having a layered blanket 400 expands if the barrier 700 is cut, torn, or leaks. For example, the layered vacuum insulation panel may return to substantially the initial thickness T1. In an exemplary embodiment, the thickness of the vacuum insulated panel 1300 having a layered blanket 400 increases by more than 40%, more than 50%, more than 75%, more than 100%, more than 125%, more than 150%, or even more than 200% when the barrier 700 is cut, torn, or leaks.

FIGS. 15A and 15B illustrate a folded blanket 1500 being compressed by the barrier 700 when air is evacuated. The initial thickness T1 of the folded blanket 1500 is reduced by the evacuation step 122 to a compressed thickness T2. In an exemplary embodiment, the thickness T1 is reduced by 40-80%, such as 50-65%, or 60-70% to the compressed thickness T2. In an exemplary embodiment, the density of the folded blanket 1500 after being compressed by the barrier 700 due to the evacuation 122 of gas may be from 3-10 lb/ft³, such as 5-7 lb/ft³.

In one exemplary embodiment, the vacuum insulation panel 1300 having a folded blanket 1500 expands if the barrier 700 is cut, torn, or leaks. For example, the layered vacuum insulation panel may return to substantially the initial thickness T1. In an exemplary embodiment, the thickness of the vacuum insulated panel 1300 having a folded blanket 400 increases by more than 40%, more than 50%, more than 75%, more than 100%, more than 125%, more than 150%, or even more than 200% when the barrier 700 is cut, torn, or leaks.

Referring to FIG. 1 after the gas inside the barrier layer 700 is evacuated 122, the barrier layer is sealed 124 to form the finished vacuum insulated panel 1300. The barrier layer can be sealed in a wide variety of different ways. For example, the barrier layer can be heat welded, radio frequency welded, and/or sealed with an adhesive. Any sealing technique can be employed. In one exemplary embodiment, the R value of the finished vacuum insulated panel is 30 to 50 per inch.

Figure 16:
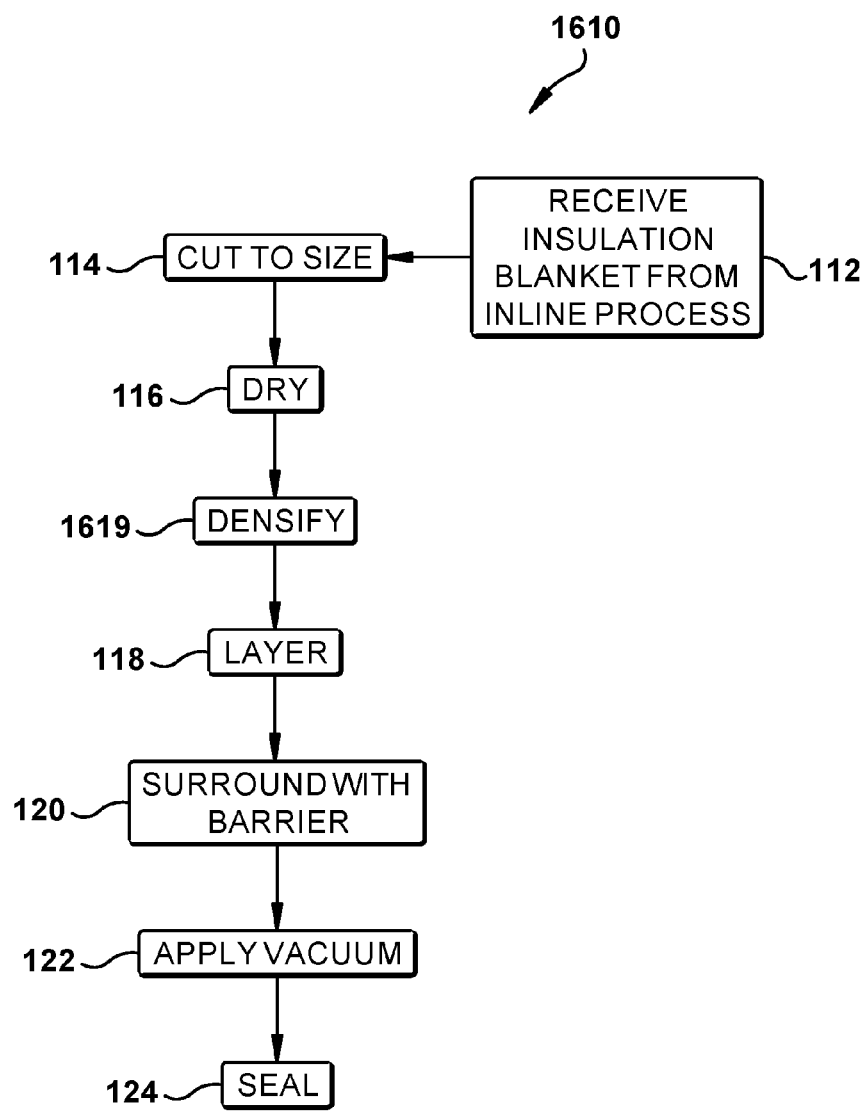
FIG. 16 is a flowchart that illustrates another exemplary embodiment of a method of making a vacuum insulated panel.

FIG. 16 illustrates another exemplary embodiment of a method 1610 of making a vacuum insulated panel 1900 (See FIG. 19B). In the method 1610, an insulation blanket is provided 112, optionally cut to size 114, dried 116, optionally layered 118, pre-densified or molded 1619, surrounded with a barrier 120, evacuated 122, and sealed 124 to form the vacuum insulated panel 1900.

The insulation blanket 200 that may be used to make the vacuum insulated panel 1900 may be as described with respect to FIG. 2. The insulation blanket 200 can be made by any of the apparatus disclosed by U.S. patent application Ser. No. 13/632,895 (Filed Oct. 1, 2012—Pub. No. 2013-0084445) and Ser. No. 13/839,350 (Filed Mar. 15, 2013).

Another insulation blanket 200 that may be used to make the insulation panel 1900 is Owens Corning ThermoRange® System (TRS) insulation. Properties of Owens Corning TRS insulation are listed above. Another insulation blanket 200 that may be used to make the insulation panel 1900 is Owens Corning GEM® insulation. Properties of Owens Corning GEM insulation are listed above.

In one exemplary embodiment, the insulation blanket 200 is formed in a dry process. That is, the fibers that form the blanket 200 are dry when they are formed into a web or a pack, not wet laid and then dried or molded. In one exemplary embodiment, the blanket 200 is binderless. That is, binders are not used to hold the fibers of the insulation blanket together. The term binderless is explained in detail in U.S. patent application Ser. Nos. 13/632,895 and 13/839,350. In another exemplary embodiment, the fibers of the blanket 200 are held together by a dry binder. In one exemplary embodiment, the fibers or layers of fibers of the blanket 200 hare held together by mechanically entangling, such as by needling.

In one exemplary embodiment, the blanket 200 is produced 112 in-line with the remainder of the steps required to make the vacuum insulated panel 1900. That is, in the in-line process, the fibers are formed, processed to form a blanket 200, and the blankets are used to make vacuum insulation panels all at the same plant. Fibers or blankets 200 are not shipped from one source to another facility where vacuum insulation panels 1300 are formed in an in-line continuous process. In another exemplary embodiment, the vacuum insulation panels 1300 are not produced in-line with the blankets 200. Rather, the blankets 200 are formed at one or more fabrication sites and shipped to a vacuum insulation panel fabrication site where the vacuum insulation panels are made.

In one exemplary embodiment, the area weight per square foot of the insulation blanket is from 0.1 lb/sf to 0.4 lb/sf. In one exemplary embodiment, the initial R value of the blanket 200 is 4 to 5 per inch. In one exemplary embodiment, the blanket has an open cell structure with a porosity wt % of greater than 90% by area. In one exemplary embodiment, the blanket 200 has a porosity wt % of between 90 and 98% by area. In one exemplary embodiment, the loss on ignition (LOI) of the blanket 200 is less than 0.5%.

In one exemplary embodiment, the fibers of the blanket 200 are oriented to optimize thermal conductivity in the direction of the thickness T of the insulation blanket. In one exemplary embodiment, the thermal conductivity of the blanket in the direction of the thickness is better than the thermal conductivity of the blanket in the direction of the length or width of the blanket. This is achieved by making the blanket that is comprised of glass fibers that are located in generally parallel planes that are oriented about 90 degrees to the direction of heat flow (i.e. the direction of the thickness of the blanket). In one exemplary embodiment, a ratio RK of the thermal conductivity $K_T$ in the direction of the thickness T of the blanket to the thermal conductivities $K_W + K_L$ in the direction of the length L and width W is:

$$R_K = \frac{K_T}{(K_W + K_L)/2} > 1.$$

Referring back to FIG. 16, in an exemplary embodiment the blanket 200 is cut 114 to the appropriate size for the vacuum insulated panel 1900. The blanket 200 may be cut to size in a wide variety of different ways. In another exemplary embodiment, the blanket 20 is made in appropriately sized pieces and does not need to be cut.

Referring to FIGS. 16 and 3, the insulation blanket 200 is dried 116 as indicated by arrows 300. The insulation blanket may be dried in a wide variety of different ways. In an exemplary embodiment, after drying 115, the moisture content remaining in the blanket is 0-0.5% by weight of the blanket after drying. Examples of ways to dry the blanket 200 include, but are not limited to, conventional heating, radio frequency heating, microwave heating, and the like. The blanket may be heated to temperatures greater than or equal to 600 degrees F., such as from 600 degrees F. to 900 degrees F., for fifteen minutes to two hours using conventional heating. When radio frequency and/or microwave heating is employed, the time required to dry the blanket 20 is less than five minutes, such as two to three minutes. FIG. 3A illustrates that the blanket 200 may be dried while the blanket is in a horizontal orientation. FIG. 3B illustrates that the blanket 200 may be dried while the blanket is in a vertical orientation.

Referring to FIGS. 16, 17A, and 17B, the blanket 200 is pre-densified or molded 1619. The pre-densification or molding 1619 can be achieved in a wide variety of different ways. In the example illustrated by FIGS. 17A and 17B the blanket 200 is positioned between an upper platen 1712 and a lower platen 1714. The density of the resulting densified board 1700, in pounds per cubic foot (pcf), is preferably within the range of from about 10 pcf to about 20 pcf, with an area weight of between 0.8 and 2.0 lb/sf. In one exemplary embodiment, the initial R value of the densified board 1700 is 5 per inch. In one exemplary embodiment, the densified board 1700 has an open cell structure with a porosity wt % of 80-90% by area. In one exemplary embodiment, the loss on ignition (LOI) of the blanket 200 is less than 0.5%.

The platens 1712, 1714 can take any form suitable for applying heat and pressure to the surfaces of the blanket 200 to form the glass fiber boards 1700. In the illustrated embodiment, platens 1712, 1714 are preferably mounted for movement vertically up and down (indicated by arrows 1719), and include heaters (indicated by arrows 1720), such as electric resistance heaters, hot gas convection heaters, microwave and/or RF assisted heating to rapidly densify or drive-out moisture from the glass core prior to making into a panel.

In one exemplary embodiment, the platens 1712, 1714 are provided with a mechanical stop as described by U.S. Pat. No. 5,330,816. The stop positively limits movement of the platens 1712, 1714 in the vertical direction and thereby define the thickness of the fiberglass board during the heat setting process.

As shown in FIG. 17B, the platens 1712, 1714 have been moved toward each other to compress the fiberglass blanket 200. In one exemplary embodiment, during the first phase of the heat setting process the platens 1712, 1714 are moved just into contact with the fiberglass blanket 200 without applying a substantial amount of pressure. The heat from the platens 1712, 1714 begins to heat up the fibers in the glass fiber blanket 200. In an exemplary embodiment, the glass fiber blanket 200 is heated prior to the application of substantial pressure by the platens 1712, 1714 so that the fibers are softened and relaxed and will not break upon the application of pressure. Preferably, the temperature of the blanket is raised to between 500 degrees F. and 900 degrees F. prior to the application of pressure by the platens. This temperature is measured at the center of the blanket 200.

After a sufficient contact time by the platens 1712, 1714, the blanket 200 reaches a temperature suitable for the application of pressure from the platens. The platens 1712, 1714 are then moved toward each other, as shown in FIG. 17B, to compress the fibers in the glass fiber blanket 200. Pressure is applied, for example up to about 35 psi and the blanket is compressed. The platens 1712, 1714 reach the limit provided by the stops to set the thickness of the formed board 1700. In another embodiment, the platens 1712, 1714 are stopped by a control mechanism, rather than physical stops.

When the heat densification 1619 is concluded, the platens 1712, 1714 are removed from the now heat treated board 1700. In one exemplary embodiment, the board 1700 is released from the platens 1712, 1714 prior to substantial cooling of the board 1700, i.e. prior to cooling of glass fibers below the strain temperature of the glass. In another embodiment, the heat densification 1619 is performed in a continuous process using an upper and lower traveling conveyer, not shown.

Figure 18A:
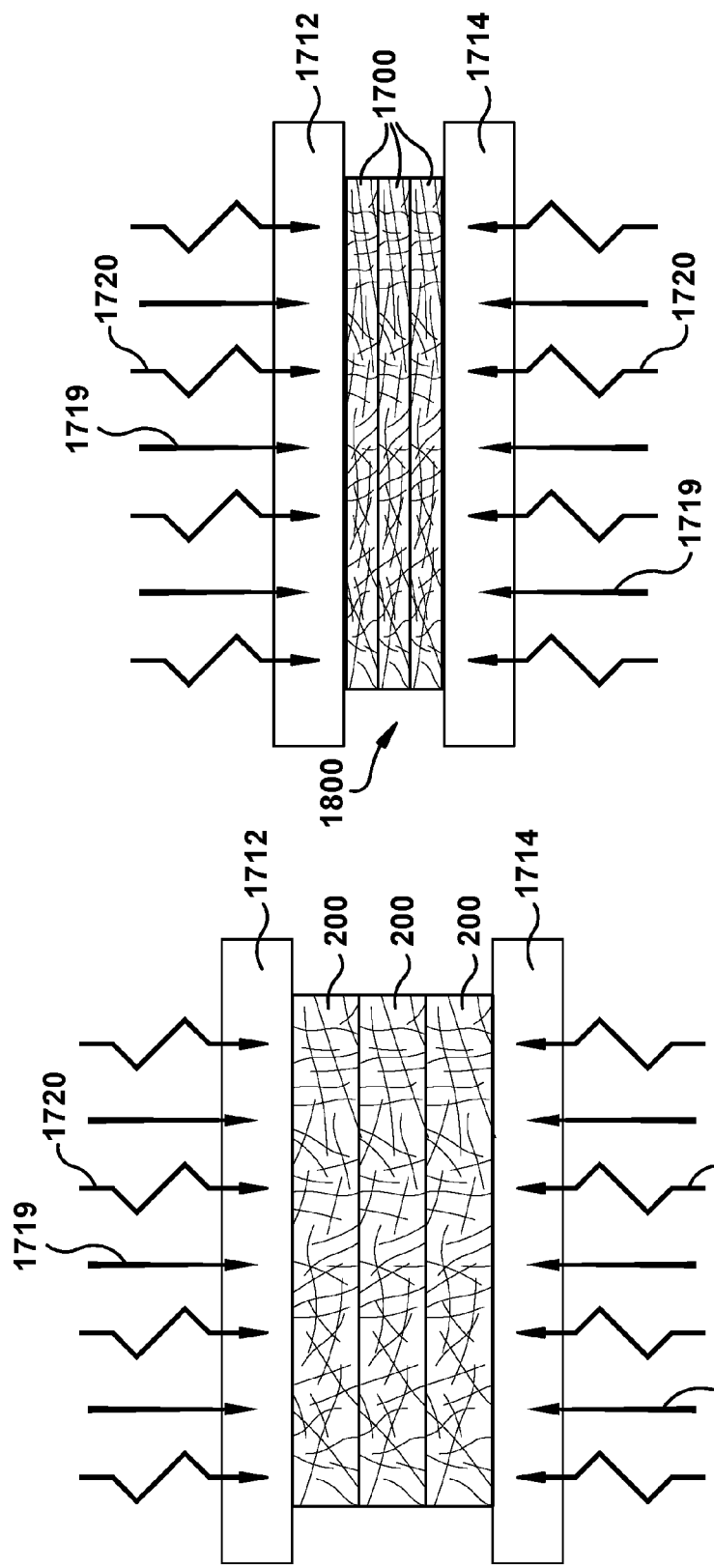

FIGS. 18A and 18B illustrate that the blankets 200 may be stacked prior to the pre-densification or molding 1619 to form a multi-layer pre-densified panel 1800. The process illustrated by FIG. 16 shows that the single layer boards 1700 can be stacked after they are densified. The densifying step 1619 would be after the layering step 118 in the example illustrated by FIGS. 18A and 18B. The pre-densification or molding 1619 multiple blankets can be achieved in a wide variety of different ways. For example, the pre-densification 1619 can be performed in the same manner as described with respect to the single layer blanket embodiment of FIGS. 17A and 17B.

The density of the resulting densified multi-layer panel 1800, in pounds per cubic foot (pcf), is preferably within the range of from about 10 pcf to about 20 pcf. In one exemplary embodiment, the initial R value of the densified multi-layer panel 1800 is 5 per inch. In one exemplary embodiment, the densified multi-layer panel 1800 has an open cell structure with a porosity wt % of 80-90% by area. In one exemplary embodiment, the loss on ignition (LOI) of the blanket 200 is less than 0.5%.

As shown in FIG. 18B, the platens 1712, 1714 have been moved toward each other to compress the multi-layer fiberglass panel 1800. In one exemplary embodiment, during the first phase of the heat setting process, the platens 1712, 1714 are moved just into contact with the layered blankets 200 without applying a substantial amount of pressure. The heat from the platens 1712, 1714 begins to heat up the fibers in the glass fiber blankets 200. In an exemplary embodiment, the glass fiber blankets 200 are heated prior to the application of substantial pressure by the platens 1712, 1714 so that the fibers are softened and relaxed and will not break upon the application of pressure. Preferably, the temperature of the blankets are raised to between 500 degrees F. and 900 degrees F. prior to the application of pressure by the platens. This temperature is measured at the center of the stack of blankets 200.

After a sufficient contact time by the platens 1712, 1714, the blankets 200 reach a temperature suitable for the application of pressure from the platens. The platens 1712, 1714 are then moved toward each other, as shown in FIG. 18B, to compress the fibers in the glass fiber blankets 200. Pressure is applied, for example up to about 35 psi and the blankets are compressed. The platens 1712, 1714 reach the limit provided by the stops to set the thickness of the formed layered board 1800. In another embodiment, the platens 1712, 1714 are stopped by a control mechanism, rather than physical stops.

When the heat densification 1619 is concluded, the platens 1712, 1714 are removed from the now heat treated multi-layer panel 1800. In one exemplary embodiment, the panel 1800 is released from the platens 1712, 1714 prior to substantial cooling of the panel 1700, i.e. prior to cooling of glass fibers below the strain temperature of the glass. In another embodiment, the heat densification 1619 is performed in a continuous process using an upper and lower traveling conveyer, not shown.

Referring to FIG. 16, in one exemplary embodiment, the insulation blanket 200 and/or insulation panel 1700 is optionally layered 118 to form a thicker vacuum insulated panel. For example, a densified insulation panel 1700 may be provided on one or both side of a blanket 200 or layered blankets to provide more rigidity to the core prior to application of the barrier layer. Any number of layers can be used to set the thickness of the panel. For example, multiple layers 400 of insulation blanket 200 and/or panels 1700 can be placed on top of one another to make a multi-layer blanket. This layering allows the thickness of the vacuum insulated panel 1300 to be changed by adding layers of the same or different thickness. The vacuum insulated panel can also be contoured by providing more or less layers of the same or different thickness in various areas of the panel. The layering can be accomplished in a wide variety of different ways. Discrete, cut blanket pieces can be stacked on top of one another. The blanket pieces can be made to include layers when they are formed as described by U.S. application Ser. Nos. 13/632,895 and 13/839,350 or pre-formed elongated lengths of insulation blankets 200 can be lapped or cross-lapped to form layers. In one exemplary embodiment, the vacuum insulated panel 1300 has from one to ten layers of blankets, such as between one and four layers of insulation blankets. However, the vacuum insulation panel 1300 can have any number of layers.

The densified insulation panels 1700 can be dried 116 as indicated by arrows 300 after layering in the same manner as described with respect to the blankets 200 (See FIG. 6). This drying may be instead of or in addition to the drying of the single layer panels 1700 that make up the multi-layer arrangement. The layered panels may be dried in any of the ways described above. In an exemplary embodiment, after drying 115, the moisture content remaining in the panels 1700 is 0-0.5% by weight of the blanket after drying.

Referring back to FIG. 16, the panels 1700 or layered panels 1800 are surrounded 120 with a barrier layer 700. The barrier layer may take a wide variety of different forms as described above. Referring to FIGS. 16, 19A, and 19B, gas inside the barrier 700 is evacuated 122 as described above Referring to FIGS. 19A and 19B, the initial thickness T1 of the panel is reduced by the evacuation step 122 to a compressed thickness T2. In an exemplary embodiment, the thickness T1 is reduced by 20-30%.

Figure 20A:
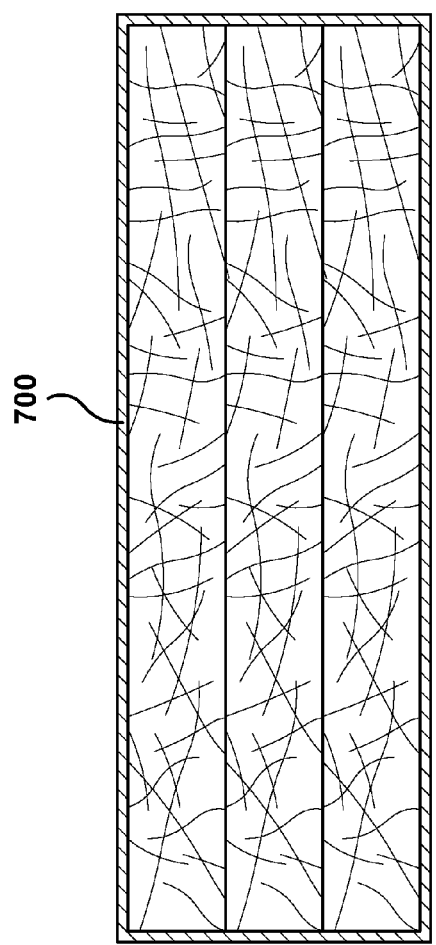
FIGS. 20A and 20B schematically illustrate compression of a layered densified insulation panel by evacuating gas from inside the barrier layer.
Figure 20B:
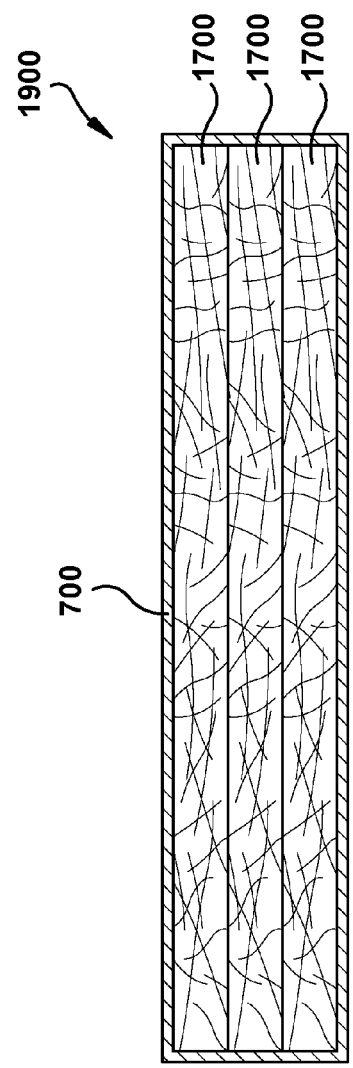

FIGS. 20A and 20B illustrate a layered panel 1800 being compressed by the barrier 700 when air is evacuated. The initial thickness T1 of the layered panel 1800 is reduced by the evacuation step 122 to a compressed thickness T2. In an exemplary embodiment, the thickness T1 is reduced by 20-30%. Referring to FIG. 16 after the gas inside the barrier layer 700 is evacuated 122, the barrier layer is sealed 124 to form the finished vacuum insulated panel 1900. The barrier layer can be sealed as described above. In one exemplary embodiment, the R value of the finished vacuum insulated panel 1800 is 30 to 50 per inch.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Therefore, the invention, in its broader aspects, is not limited to the specific details, the representative apparatus, and illustrative examples shown and described. Accordingly, departures can be made from such details without departing from the spirit or scope of the applicant's general inventive concept.

What is claimed is:

1. A vacuum insulated panel comprising:
  a fiberglass insulation blanket, comprising;
    a first binderless web of glass fibers;
    at least one additional binderless web of glass fibers disposed on the first web of glass fibers;
    wherein the fibers of the first binderless web are mechanically entangled with the fibers of the at least one additional binderless web;
  a barrier layer sealed around the fiberglass insulation blanket, wherein gas inside the barrier layer is evacuated such that the fiberglass insulation blanket is compressed,
  wherein the density of the fiberglass insulation blanket is 2.5 to 6 pcf prior to compression by the barrier layer and the density of the fiberglass insulation blanket is 5 to 7 pcf after compression by the barrier layer,
  wherein the density of the insulation blanket is greater after compression than prior to compression, and
  wherein resilience of the fiberglass insulation blanket causes the vacuum insulation panel to expand by 75% or more when the barrier layer is torn.

2. The vacuum insulated panel of claim 1 wherein the fiberglass insulation blanket is not heat-densified or molded.

3. The vacuum insulated panel of claim 1 wherein the fiberglass insulation blanket is flexible, such that outside the barrier layer the fiberglass insulation blanket can be draped over a narrow elongated member that is supported at both ends.

4. The vacuum insulated panel of claim 1 wherein an R value of the finished vacuum insulated panel is 30-50/inch.

5. The vacuum insulated panel of claim 1 wherein the barrier layer compresses the fiber glass insulation by 60 to 70 percent.

6. The vacuum insulated panel of claim 1 wherein the at least one additional binderless web is lapped or cross-lapped on the first binderless web.

7. A method of making a vacuum insulated panel, comprising:
  forming a continuous, binderless web of glass fibers;
  depositing a first layer of the continuous web of glass fibers onto a second layer of the continuous web of glass fibers;
  mechanically entangling the fibers of the first layer with the fibers of the second layer to form a fiberglass insulation blanket;

providing a barrier layer around the fiberglass insulation blanket;

evacuating gas from inside the barrier layer to compress the fiberglass insulation blanket, wherein the density of the fiberglass insulation blanket is 2.5 to 6 pcf prior to compression by the barrier layer and the density of the fiberglass insulation blanket is 5 to 7 pcf after compression by the barrier layer, wherein the density of the insulation blanket is greater after compression than prior to compression, and wherein resilience of the fiberglass insulation blanket causes the vacuum insulation panel to expand by 75% or more when the barrier layer is torn.

8. The method of claim 7 wherein the fiberglass insulation blanket is not heat-densified or molded.

9. The method of claim 7 wherein the fiberglass insulation blanket is flexible, such that outside the barrier layer the fiberglass insulation blanket can be draped over a narrow elongated member that is supported at both ends.

10. The method of claim 7 wherein an R value of the finished vacuum insulated panel is 30-50/inch.

11. The method of claim 7 wherein the barrier layer compresses the fiber glass insulation by 60 to 70 percent.

12. The method of claim 7 wherein depositing a first layer of the continuous web of glass fibers onto a second layer of the continuous web of glass fibers includes lapping or cross-lapping the first layer onto the second layer.

13. The vacuum insulated panel of claim 1 wherein the fibers of the first binderless web are mechanically entangled with the fibers of the at least one additional binderless web by stitching or needling.

14. The vacuum insulated panel of claim 1 wherein the fiberglass insulation blanket has a thickness, a length, and a width, and wherein the blanket has a ratio (RK) of thermal conductivity in the direction of the thickness of the blanket to the thermal conductivities in the direction of the length and width or the blanket that is greater than 1.0.

15. The method of claim 7 wherein mechanically entangling the fibers of the first layer with the fibers of the second layer includes stitching or needling first and second layer.

16. The method of claim 7 wherein the fiberglass insulation blanket has a thickness, a length, and a width, and wherein the blanket has a ratio (RK) of thermal conductivity in the direction of the thickness of the blanket to the thermal conductivities in the direction of the length and width or the blanket that is greater than 1.0.

* * * * *